US012776261B2

(12) United States Patent
Hyun

(10) Patent No.: US 12,776,261 B2
(45) Date of Patent: Oct. 27, 2026

(54) STAGE CIRCUIT AND DISPLAY DEVICE INCLUDING THE SAME, AND ELECTRONIC DEVICE

(71) Applicant: SAMSUNG DISPLAY CO., LTD., Yongin-si (KR)

(72) Inventor: Chae Han Hyun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/332,196

(22) Filed: Sep. 18, 2025

(65) Prior Publication Data

US 2026/0301648 A1 Oct. 1, 2026

(30) Foreign Application Priority Data

Mar. 27, 2025 (KR) ........................ 10-2025-0039523

(51) Int. Cl.
*G09G 3/32* (2016.01)

(52) U.S. Cl.
CPC ....... *G09G 3/32* (2013.01); *G09G 2300/0819* (2013.01); *G09G 2310/0267* (2013.01); *G09G 2310/08* (2013.01)

(58) Field of Classification Search
CPC ............. G09G 3/32; G09G 2300/0819; G09G 2310/0267; G09G 2310/08
See application file for complete search history.

(56) References Cited

U.S. PATENT DOCUMENTS

| | | | | |
|---|---|---|---|---|
| 12,087,232 | B2 * | 9/2024 | Noh | G09G 3/32 |
| 2020/0320935 | A1 * | 10/2020 | Jeon | G09G 3/3275 |
| 2024/0212549 | A1 * | 6/2024 | Lim | G09G 3/20 |

FOREIGN PATENT DOCUMENTS

| | | |
|---|---|---|
| KR | 10-0353952 B1 | 9/2002 |

* cited by examiner

*Primary Examiner* — Jonathan A Boyd
(74) *Attorney, Agent, or Firm* — F. CHAU & ASSOCIATES, LLC

(57) ABSTRACT

A stage circuit according to an embodiment of the disclosure includes first, second, third, and fourth input terminals, an input part configured to transmit a carry signal to a second node in response to the clock signal, a first signal processing part configured to selectively transmit the on-voltage and the carry signal to a first node in response to the clock signal and the first signal processing part including a capacitor connected between the first node and the second node, and a switching element electrically connecting the second node to a fourth node, a second signal processing part configured to control a voltage of a third node in response to a voltage of the second node, and an output part configured to selectively output the on-voltage and the off-voltage as a scan signal depending on the voltage of the third node and a voltage of the fourth node.

20 Claims, 17 Drawing Sheets

621: T2, T3
631: T5, T6

STAGE CIRCUIT AND DISPLAY DEVICE INCLUDING THE SAME, AND ELECTRONIC DEVICE

CROSS-REFERENCE TO RELATED APPLICATION(S)

This application claims priority under 35 U.S.C. § 119 to and benefits from Korean Patent Application No. 10-2025-0039523 filed in the Korean Intellectual Property Office (KIPO) on Mar. 27, 2025, the entire contents of which are herein incorporated by reference.

TECHNICAL FIELD

This disclosure relates to a stage circuit, a display device including the same, and an electronic device including the display device that results in improved reliability of produced scan signals.

DISCUSSION OF RELATED ART

With the development of information technology, the importance of display devices, which are a connection medium between a user and information, is being highlighted. Accordingly, the use of display devices such as a liquid crystal display device and an organic light emitting display device is increasing.

The display device may include stage circuits for sequentially generating scan signals. For example, a preceding stage of the stage circuits may output a driving signal (e.g., a carry signal), and a trailing stage may receive an input of a driving signal (e.g., a carry signal) output by the preceding stage, and generate scan signals and carry signals based thereon.

SUMMARY

An aspect of the disclosure is to improve the reliability of driving of a stage circuit, a display device including the same, and an electronic device according to an embodiment of the disclosure.

A stage circuit according to an embodiment of the disclosure includes a first terminal which to a carry signal is input, a second terminal which to a clock signal is input, a third terminal which to an on-voltage is input, a fourth terminal which to an off-voltage is input. The stage circuit also includes an input part configured to transmit the carry signal to a second node in response to the clock signal, a first signal processing part configured to selectively transmit the on-voltage and the carry signal to a first node in response to the clock signal, and including a capacitor connected between the first node and the second node. The stage circuit further includes a switching element electrically connecting the second node to a fourth node, a second signal processing part configured to control a voltage of a third node in response to a voltage of the second node, and an output part configured to selectively output the on-voltage and the off-voltage as a scan signal, depending on the voltage of the third node and a voltage of the fourth node.

The first signal processing part may further include a first inverter connected between the first terminal and the third terminal, the first signal processing part may be configured to selectively transmit the carry signal of the first terminal and an on-voltage of the third terminal to the first node in response to the clock signal.

The switching element may further include a transistor connected between the second node and the fourth node and turned on in response to the carry signal.

The second signal processing part may include a second inverter connected between the third terminal and the fourth terminal. The second signal processing part may be configured to selectively transmit the on-voltage of the third terminal and the off-voltage of the fourth terminal to the third node in response to a voltage of the second node.

The second signal processing part may further include a transistor electrically connecting the third terminal and the fourth node in response to the voltage of the third node.

After the carry signal may be enabled to a high level, the voltage of the second node has a first voltage level, after the carry signal is disabled to a low level, as the carry signal is transmitted to the second node in response to the clock signal, the voltage of the second node may transition from the first voltage level to a second voltage level, and the second voltage level may be lower than the first voltage level.

After the voltage of the second node is transitioned to the second voltage level, the low level of the carry signal may be transmitted to the first node in response to the clock signal, causing the voltage of the first node to decrease.

As a decrease in the voltage of the first node is transmitted to the second node via the capacitor, the voltage of the second node may transition from the second voltage level to a third voltage level, and the third voltage level may be lower than the second voltage level.

The switching element may transmit the third voltage level of the second node to the fourth node.

The stage circuit may further include a reset terminal receiving a reset signal, and the second signal processing part may be configured to initialize the voltage of the third node in response to the reset signal.

The stage circuit may further include a reset terminal receiving a reset signal, and the second signal processing part may be configured to initialize the voltage of the fourth node in response to the reset signal.

Another aspect of the disclosure is related to a display device. The display device according to an embodiment of the disclosure includes pixels, and a plurality of stage circuits providing scan signals to the pixels via scan lines. One of the stage circuits includes a first transistor including a first electrode connected to a first terminal receiving a carry signal, a second electrode connected to a second node, and a gate electrode connected to a second terminal receiving a clock signal, a second transistor including a first electrode connected to a third terminal receiving an on-voltage, a second electrode connected to a first node, and a gate electrode connected to the second terminal, a third transistor including a first electrode connected to the first node, a second electrode connected to a first terminal to which a carry signal is input, and a gate electrode connected to the second terminal, a first capacitor connected between the first node and the second node, a fourth transistor including a first electrode connected to the second node, a second electrode connected to a fourth node, and a gate electrode connected to the first terminal, a fifth transistor including a first electrode connected to the third terminal, a second electrode connected to the third node, and a gate electrode connected to the second node, and a sixth transistor including a first electrode connected to the third node, a second electrode connected to a fourth terminal receiving an off-voltage input, and a gate electrode connected to the second node.

The one of the stage circuits may further include a seventh transistor including a first electrode connected to the third terminal, a second electrode connected to the fourth node, and a gate electrode connected to the third node, an eighth transistor including a first electrode connected to the third terminal, a second electrode connected to an output terminal, and a gate electrode connected to the third node, a ninth transistor including a first electrode connected to the output terminal, a second electrode connected to the fourth terminal, and a gate electrode connected to the fourth node, and a second capacitor connected between the third terminal and the third node.

The one of the stage circuits may further include a tenth transistor including a first electrode connected to the second electrode of the first transistor, a second electrode connected to a fifth node connected to the fourth transistor and the first capacitor, and a gate electrode connected to the fourth terminal.

The one of the stage circuits may further include an eleventh transistor including a first electrode receiving either the on-voltage or the off-voltage, a second electrode connected to the fourth node, and a gate electrode connected to a reset terminal receiving a reset signal.

The one of the stage circuits may further include an eleventh transistor including a first electrode connected to the third node, a second electrode receiving either the on-voltage or the off-voltage, and a gate electrode connected to a reset terminal receiving a reset signal.

The one of the stage circuits may further include an eleventh transistor including a first electrode receiving either the on-voltage or the off-voltage, a second electrode connected to the fourth node, and a gate electrode connected to a reset terminal receiving a reset signal.

The one of the stage circuits may further include an eleventh transistor including a first electrode connected to the third node, a second electrode receiving either the on-voltage or the off-voltage, and a gate electrode connected to a reset terminal receiving a reset signal.

The second transistor and the fifth transistor may be transistors including a P-type semiconductor, and the third transistor and the sixth transistor may be transistors including an N-type semiconductor.

Another aspect of the disclosure is related to an electronic device. The electronic device according to an embodiment of the disclosure includes a processor providing input image data, and a display device displaying an image based on the input image data. The display device includes pixels, and a plurality of stage circuits providing scan signals to the pixels via scan lines. Each of the stage circuits includes a first terminal which to a carry signal is input, a second terminal which to a clock signal is input, a third terminal which to an on-voltage is input, a fourth terminal which to an off-voltage is input, an input part to transmit the carry signal to a second node in response to the clock signal, a signal processing part including a first control part controlling a voltage of a first node in response to the clock signal and a second control part controlling a voltage of a third node in response to the carry signal, and changing a voltage of the second node in response to a change in the voltage of the first node, and an output part selectively outputting the on-voltage and the off-voltage as a scan signal, depending on the voltage of the third node and a voltage of the fourth node. Each of the first control part and the second control part includes different types of transistors.

According to embodiments of the disclosure, the reliability of driving the stage circuit, the display device including the same, and the electronic device may be improved.

The effects in the embodiments are not necessarily limited to those illustrated above, and more varied effects are included in this disclosure.

BRIEF DESCRIPTION OF THE DRAWINGS

The above and other features of the present disclosure will become more apparent by describing embodiments thereof in detail with reference to the accompanying drawings in which.

DETAILED DESCRIPTION OF THE EMBODIMENTS

Figure 1:
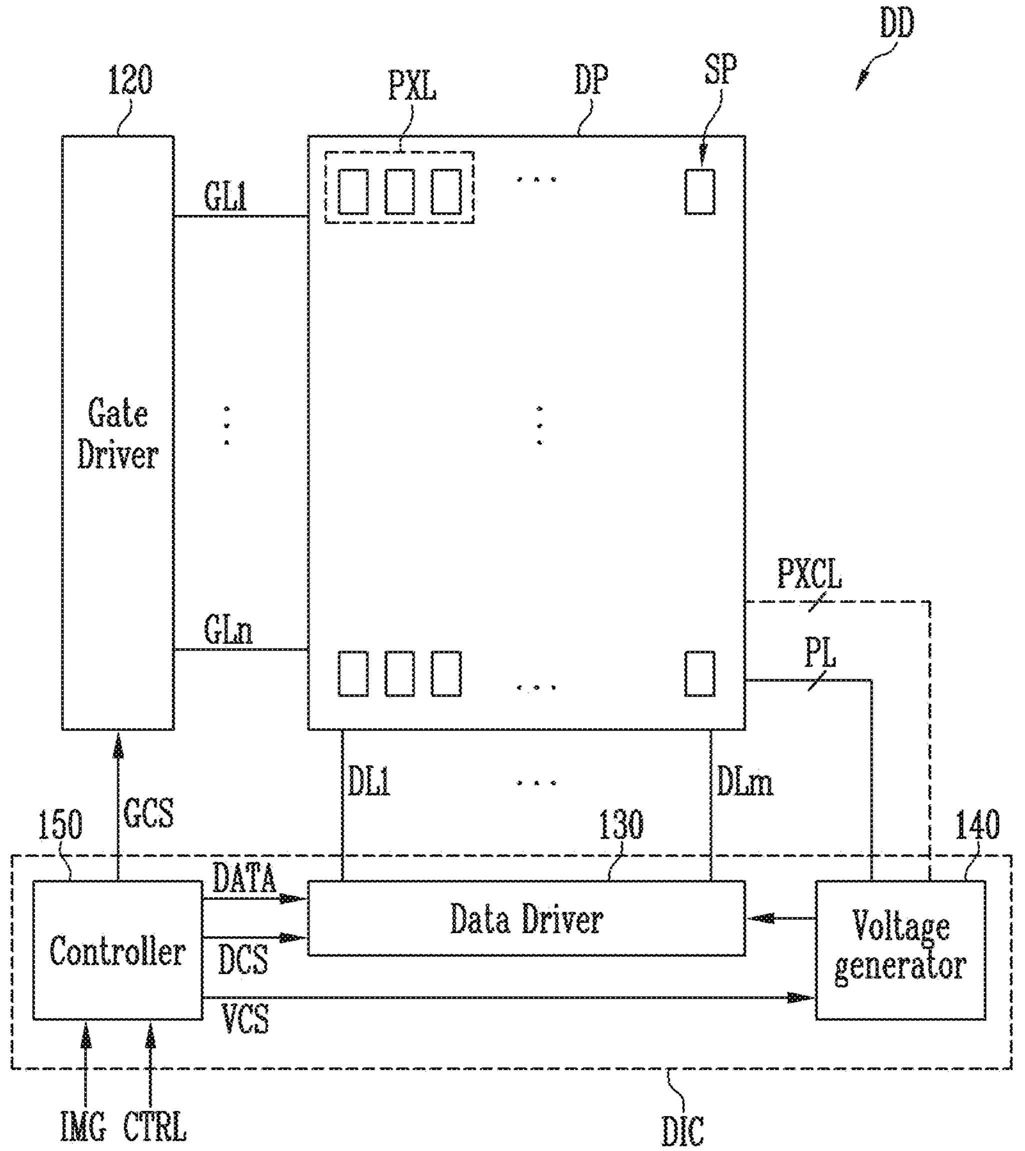
FIG. 1 is a block diagram illustrating an embodiment of a display device.

Hereinafter, embodiments according to the disclosure may be described in detail with reference to the accompanying drawings. It should be noted that in the following description, the parts desirable to understand the operation according to the disclosure are described, and descriptions of other parts will be omitted so as not to obscure the gist. The disclosure is not necessarily limited to the embodiments described herein, and may be embodied in other forms. However, the embodiments described herein are provided to explain in detail to the extent that technical ideas may be readily implemented to those skilled in the art to which the disclosure belongs.

Throughout the disclosure, when a part is "connected" to another part, this may include not only a case where the part is "directly connected" but also a case where it is "indirectly connected" with another element interposed therebetween. The terminology used herein is for the purpose of describing particular embodiments and is not intended to limit the disclosure. Throughout the disclosure, when it is said that a part may "include" a component, this may mean that other components may be further included, rather than excluding other components, unless otherwise specified. "At least one of X, Y, and Z", and "at least one selected from the group consisting of X, Y and Z" may be interpreted as one X, one Y, one Z, or any combination of two or more of X, Y or Z (e.g., XYZ, XY, YZ, ZX). Here, "and/or" may include any combination of one or more of the corresponding configurations.

Here, terms such as first, second, and the like may be used to describe various components, but these components are not necessarily limited to these terms. These terms may be used to distinguish one component from another. Accordingly, a first component may refer to a second component without departing from what is disclosed herein.

Spatially relative terms such as "below", "above", and the like may be used for purposes of description, thereby describing a relationship of an element or feature to another element(s) or feature(s), as shown in the figures. Spatially relative terms are intended to include different directions in use, operation, and/or manufacture, in addition to the directions depicted in the figures. For example, if the device shown in the figure is flipped over, elements depicted as being "below" other elements or features may be positioned in a direction "above" the other elements or features. Thus, in an embodiment, the term "below" may include both directions above and below. The device may be directed in another direction (e.g., rotated 90 degrees or in another direction), and thus, the spatially relative terms used herein may be interpreted accordingly.

Various embodiments may be described with reference to the figures, some of which are schematic diagrams. It will be appreciated that illustrative shapes shown in the figures may vary depending on, for example, tolerances and/or manufacturing techniques. Accordingly, the embodiments disclosed herein might not be construed as limited to the particular shapes shown, but may be construed as including, for example, changes in shapes that occur as a result of fabrication. As such, the shapes shown in the drawings might not show actual shapes of regions of the apparatus, and the embodiments are not necessarily limited thereto.

While each drawing may represent one or more particular embodiments of the present disclosure, drawn to scale, such that the relative lengths, thicknesses, and angles can be inferred therefrom, it is to be understood that the disclosure is not necessarily limited to the relative lengths, thicknesses, and angles shown. Changes to these values may be made within the spirit and scope of the present disclosure, for example, to allow for manufacturing limitations and the like.

According to embodiments of the disclosure, a stage circuit ST (see. E.g., FIG. 4) for a display scan driver 120 is disclosed that includes inverters, capacitors and transistors, where a boosting capacitor C1 is included between two nodes N1 and N2 to decrease a voltage at a second node N2 according to a voltage across the capacitor or according to a voltage at first node N1 so that changes to a voltage at the first node N1 are transferred to the second node N2 so that second node N2 can reliably maintain a value of VGL2 to improve driving reliability of the stage circuit. The decreased voltage is transferred to a fourth node N4 to reliably turn on an output transistor T9 so that a low voltage VOFF can be reliably output to the scan line SSi. Also, a first signal processing part 420 that includes the first node N1 and the boosting capacitor C1 may also include another transistor T10 to prevent the voltage at the second node N2 from becoming excessively too high or too low to prevent thermal damage to the transistors, thereby further enhancing reliability of the scan driver 120.

FIG. 1 is a block diagram illustrating an embodiment of a display device.

Referring to FIG. 1, the display device 100 may include a display panel DP, a gate driver 120, a data driver 130, a voltage generator 140, and a controller 150.

The display panel DP may include sub-pixels SP. The sub-pixels SP may be connected to the gate driver 120 via the first to n-th gate lines GL1 to GLn. The sub-pixels SP may be connected to the data driver 130 via the first to m-th data lines DL1 to DLm.

The sub-pixels SP may emit light of two or more colors. Each of the sub-pixels SP may emit light of red, green, blue, cyan, magenta, yellow, etc.

Two or more sub-pixels among the sub-pixels SP may form a pixel PXL. For example, a pixel PXL may include three sub-pixels as shown in FIG. 1. In this way, the pixel PXL may emit light of different colors and brightness, according to combination of the light emitted by the sub-pixels included therein.

The gate driver 120 is connected to the sub-pixels SP arranged in a row direction through the first to n-th gate lines GL1 to GLn. The gate driver 120 may output scan signals to the first to n-th gate lines GL1 to GLn in response to a gate control signals GCS. In embodiments, the gate control signal GCS may include a scan start signal FLM (see FIG. 3) and a clock signal CLK (see FIG. 3).

The gate driver 120 may be located on a side of the display panel DP. However, embodiments are not necessarily limited thereto. For example, the gate driver 120 may be divided into two or more physically and/or logically separated drivers, and such drivers may be placed on a first side of the display panel DP and a second side of a display panel DP opposite the first side. In this way, the gate driver 120 may be located around the display panel DP in various forms according to the embodiments.

The data driver 130 may be connected to the sub-pixels SP arranged in a column direction via the first to m-th data lines DL1 to DLm. The data driver 130 may receive image data DATA and a data control signal DCS from the controller 150. The data driver 130 may operate in response to the data control signal DCS. In embodiments, the data control signal DCS may include a source start signal, a source shift clock, and a source output enable signal.

The data driver 130 may receive voltages from the voltage generator 140. Using the received voltages, the data driver 130 may provide data signals having grayscale voltages corresponding to the image data DATA to the first or m-th data lines DL1 to DLm. When a scan signal is provided to the first to n-th gate lines GL1 to GLn, the data signals corresponding to the image data DATA may be provided to the data lines DL1 to DLm. Accordingly, the sub-pixels SP may generate light corresponding to the data signals, and the display panel DP may display an image.

In embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 may be configured to generate multiple voltages and to supply the generated voltages to components of the display device 100, such as the gate driver 120, data driver 130, and the controller 150. The voltage generator 140 may generate multiple voltages by receiving input voltages from an exterior of the display device 100 and by regulating the received voltage.

The voltage generator 140 may generate a first power voltage and a second power voltage. The generated first and second power voltages may be supplied to the sub-pixels SP through power lines PL.

In an embodiment, at least one of the first and second power voltages may be supplied from an exterior the display device 100.

According to an embodiment, the voltage generator 140 may supply an on-voltage VON (see FIG. 3) and an off-voltage VOFF (see FIG. 3) to the gate driver 120. Here, the on-voltage VON and the off-voltage VOFF may be different from the first power voltage and the second power voltage. However, the disclosure is not necessarily limited thereto.

Furthermore, the voltage generator 140 may provide various voltages and/or signals. For example, the voltage generator 140 may provide one or more initialization-voltage provided in the sub-pixels SP. For example, in a sensing operation for sensing electrical characteristics of transistors and/or light-emitting elements of sub-pixels SP, a set reference voltage may be provided to the first to m-th data lines DL1 to DLm, and the voltage generator 140 may generate and transmit the reference voltage to the data driver 130. For example, during a display operation to display an image on the display panel DP, common pixel control signals may be provided to the sub-pixels SP, and the voltage generator 140 may generate the pixel control signals. In an embodiment, the voltage generator 140 may provide the pixel control signals to the sub-pixels SP through pixel control lines PXCL. In FIG. 1, the pixel control lines PXCL are shown to be connected between the voltage generator 140 and the display panel DP, but embodiments are not necessarily limited thereto. For example, the pixel control lines PXCL may be connected between the gate driver 120 and the display panel DP. The pixel control signals may be transmitted from the voltage generator 140 to the pixel control lines PXCL via the gate driver 120.

The controller 150 controls all operations of the display device 100. The controller 150 receives input image data IMG and a control signal CTRL corresponding thereto from an exterior. In response to the control signal CTRL, the controller 150 may provide the gate control signal GCS, the data control signal DCS, and the voltage control signal VCS.

The controller 150 may output the image data DATA by converting the input image data IMG to be suitable for the display device 100 or the display panel DP. In embodiments, the controller 150 may output the image data DATA by arranging the input image data IMG to be suitable for the sub-pixels SP in a row.

Two or more components among the data driver 130, the voltage generator 140, and the controller 150 may be embedded in one (e.g., single) integrated circuit. As shown in FIG. 1, the data driver 130, the voltage generator 140, and the controller 150 may be included in a driver integrated circuit DIC. The data driver 130, the voltage generator 140, and the controller 150 may be functionally separate components in a single driver integrated circuit DIC. In an embodiment, at least one of the data driver 130, voltage generator 140, and controller 150 may be provided as a separate component from the driver integrated circuit DIC.

Figure 2:
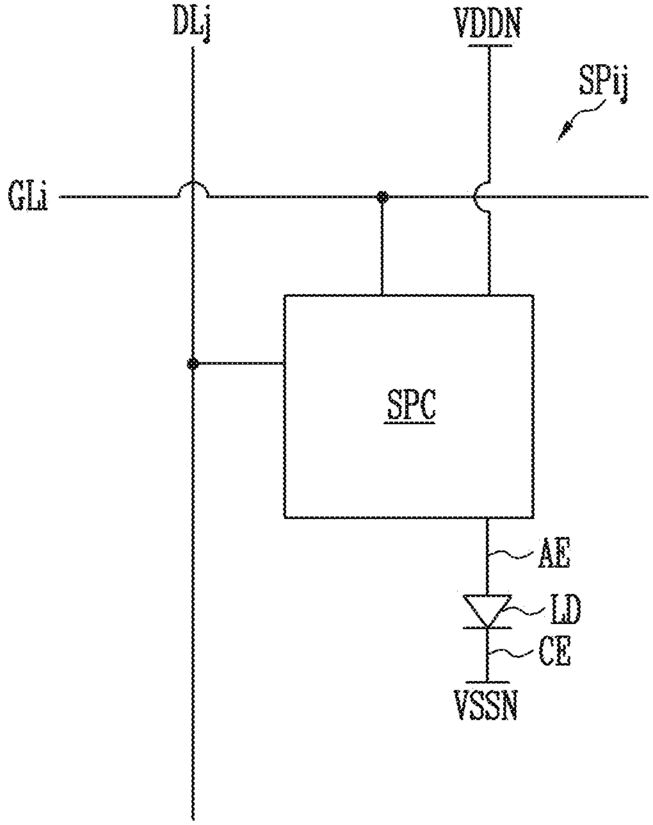
FIG. 2 is a block diagram illustrating an embodiment of any one of sub-pixels of FIG. 1.

FIG. 2 is a block diagram illustrating an embodiment of one (e.g., single) sub-pixel of FIG. 1. In FIG. 2, a sub-pixel SPij arranged in a i-th row (where i is an integer equal to or greater than 1 and equal to or smaller than m) and a j-th column (where j is an integer equal to or greater than 1 and equal to or smaller than n) of the sub-pixels SP of FIG. 1 is illustrated as an example.

Referring to FIG. 2, the sub-pixel SPij may include a sub-pixel circuit SPC and a light-emitting element LD.

The light-emitting element LD may be connected between a first power voltage node VDDN and a second power voltage node VSSN. The first power voltage node VDDN may be connected to one of the power lines PL of FIG. 1 and may receive a first power voltage. The second power voltage node VSSN may be connected to another one of the power lines PL in FIG. 1 and may receive a second power voltage. The first power voltage may have a higher voltage level than the second power voltage.

The light-emitting element LD may be connected between an anode electrode AE and a cathode electrode CE. The anode electrode AE may be connected to the first power voltage node VDDN via the sub-pixel circuit SPC. For example, the anode electrode AE may be connected to the first power voltage node VDDN via one or more transistors included in the sub-pixel circuit SPC. The cathode electrode CE may be connected to the second power voltage node VSSN. The light-emitting element LD may be configured to emit light according to a current flowing from the anode electrode AE to the cathode electrode CE.

The sub-pixel circuit SPC may be connected to i-th gate line GLi among the first to n-th gate lines GL1 to GLn of FIG. 1, and to a j-th data line DLj among the first to m-th data lines DL1 to DLm of FIG. 1. In response to a scan signal received through the i-th gate line GLi, the sub-pixel circuit SPC controls the light-emitting element LD to emit light according to a data signal received through the j-th data line DLj. In embodiments, the sub-pixel circuit SPC may be further connected to the pixel control lines PXCL of FIG. 1. The sub-pixel circuit SPC may control the light-emitting element LD more responsively than pixel control signals received through the pixel control lines PXCL.

For these operations, the sub-pixel circuits SPC may include circuit components, for example transistors and one or more capacitors.

The transistors in the sub-pixel circuit SPC may include N-type transistors and/or P-type transistors. In embodiments, the transistors in the sub-pixel circuit SPC may include a Metal Oxide Silicon Field Effect Transistor (MOSFET). In embodiments, the transistors in the sub-pixel circuit SPC may include an amorphous silicon semiconductor, a monocrystalline silicon semiconductor, a polycrystalline silicon semiconductor, an oxide semiconductor, etc.

Figure 3:
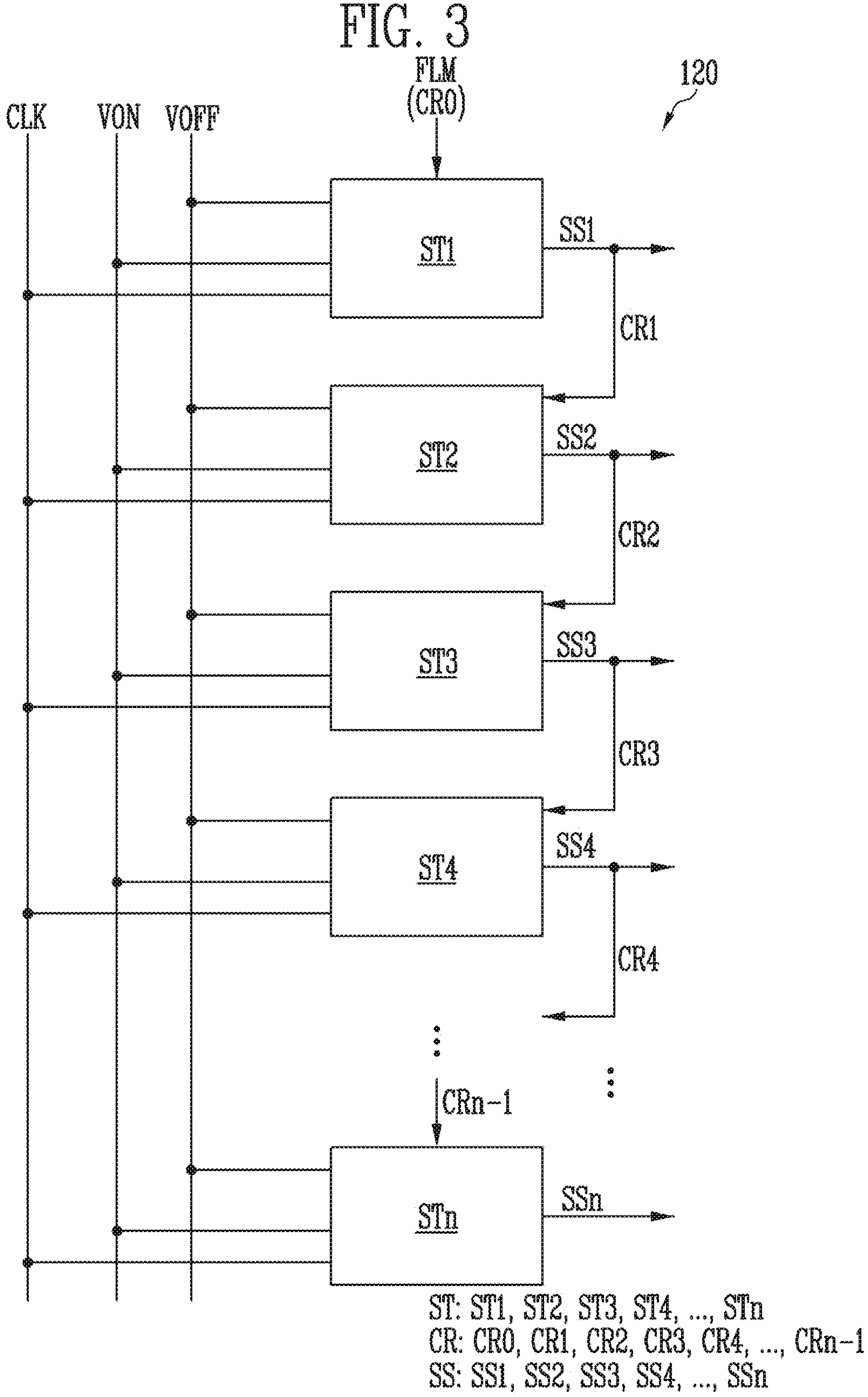
FIG. 3 is a block diagram illustrating an embodiment of a gate driver of FIG. 1.

FIG. 3 is a block diagram illustrating an embodiment of a gate driver of FIG. 1.

Referring to FIG. 3, the gate driver 120 may include a plurality of stage circuits ST. Each of the stage circuits ST may be connected to one of the first to n-th gate lines GL1 to GLn (see FIG. 1). Each of the stage circuits ST may receive a carry signal and may output a scan signal to a corresponding gate line in response to a received carry signal. Each of the stage circuits ST may be operable in response to at least one clock signal CLK. The clock signal CLK may be included in the gate control signal GCS of FIG. 1.

A scan start signal FLM may be provided from the controller 150 of FIG. 1. For example, the scan start signal FLM may be included in the gate control signal GCS of FIG. 1.

The scan start signal FLM and first to (n−1)-th carry signals CR1 to CRn-1 may be sequentially toggling signals. Accordingly, the scan start signal FLM may be understood as a zeroth carry signal CR0 that is generated before the first carry signal CR1. According to an embodiment, the scan start signal FLM may be referred to as the carry signal CR0.

A first stage circuit ST1 may supply a first scan signal SS1 to the first gate line among the first to n-th gate lines GL1 to GLn in response to the scan start signal FLM. The first scan signal SS1 may be provided to a second stage circuit ST2, which is a next stage, as a first carry signal CR1.

The second stage circuit ST2 may be configured similarly to the first stage circuit ST1. The second stage circuit ST2 may supply a second scan signal SS2 to a second gate line among the first to n-th gate lines GL1 to GLn in response to the first carry signal CR1. The first scan signal SS1 may be provided to the second stage circuit ST2, which is a next stage, as the first carry signal CR1. However, embodiments are not necessarily limited thereto. For example, each stage may include an output circuit that generates a carry signal to be provided to a next stage by delaying a corresponding scan signal.

A third stage circuit ST3 may be configured similarly to the second stage circuit ST2. For example, the third stage circuit ST3 may supply a third scan signal SS3 to a third gate line among the first to n-th gate lines GL1 to GLn in response to a second carry signal CR2. The second scan signal SS2 may be provided to the third stage circuit ST3, which is a next stage, as the second carry signal CR2. However, embodiments are not necessarily limited thereto. For example, each stage may include an output circuit that generates a carry signal to be provided to the next stage by delaying the corresponding scan signal.

A fourth stage circuit ST4 may be configured similarly to the second stage circuit ST2. For example, the fourth stage circuit ST4 may supply a fourth scan signal SS4 to a fourth gate line among the first to n-th gate lines GL1 to GLn in response to a third carry signal CR3. The third scan signal SS3 may be provided to the fourth stage circuit ST4, which is a next stage, as the third carry signal CR3. However, embodiments are not necessarily limited thereto. For example, each stage may include an output circuit that generates a carry signal to be provided to the next stage by delaying the corresponding scan signal.

A n-th stage circuit STn may be configured similarly to the second stage circuit ST2. For example, the n-th stage circuit STn may supply a n-th scan signal SSn to a n-th gate line GLn among the first to n-th gate lines GL1 to GLn in response to a (n-1)-th carry signal CRn-1. The (n-1)-th scan signal may be provided as the (n−1)-th carry signal (CRn-1) to the n-th stage circuit STn which is a next stage. However, embodiments are not necessarily limited thereto. For example, each stage may include an output circuit that generates a carry signal to be provided to the next stage by delaying the corresponding scan signal.

Each of the stage circuits ST may receive an on-voltage VON and an off-voltage VOFF. The on-voltage VON may have a voltage level that can turn on transistors of the sub-pixels SP (see FIG. 1) that receive a scan signal. For a case in which the transistors of the sub-pixels SP receiving the scan signal are N-type transistors, the on-voltage VON has a positive voltage level. The off-voltage VOFF may have a voltage level that can turn off the transistors of the sub-pixels SP receiving the scan signal. For a case in which the transistors of the sub-pixels SP receiving the scan signal are N-type transistors, the off-voltage VOFF may have a negative voltage level. Hereinafter, for simplicity of explanation, it is assumed that the on-voltage VON has a positive voltage level and the off-voltage VOFF has a negative voltage level. For a case in which the off-voltage VOFF may be lower than the on-voltage VON.

According to an embodiment, the on-voltage VON and off-voltage VOFF may be provided from the voltage generator 140. According to an embodiment, the on-voltage VON and off-voltage VOFF may be generated by the gate driver 120 itself.

According to embodiments, a high-level voltage VGH may be a voltage to drive an NMOS transistor, and a low-level voltage VGL may be a voltage to drive a PMOS transistor. However, it is not necessarily limited thereto.

Figure 4:
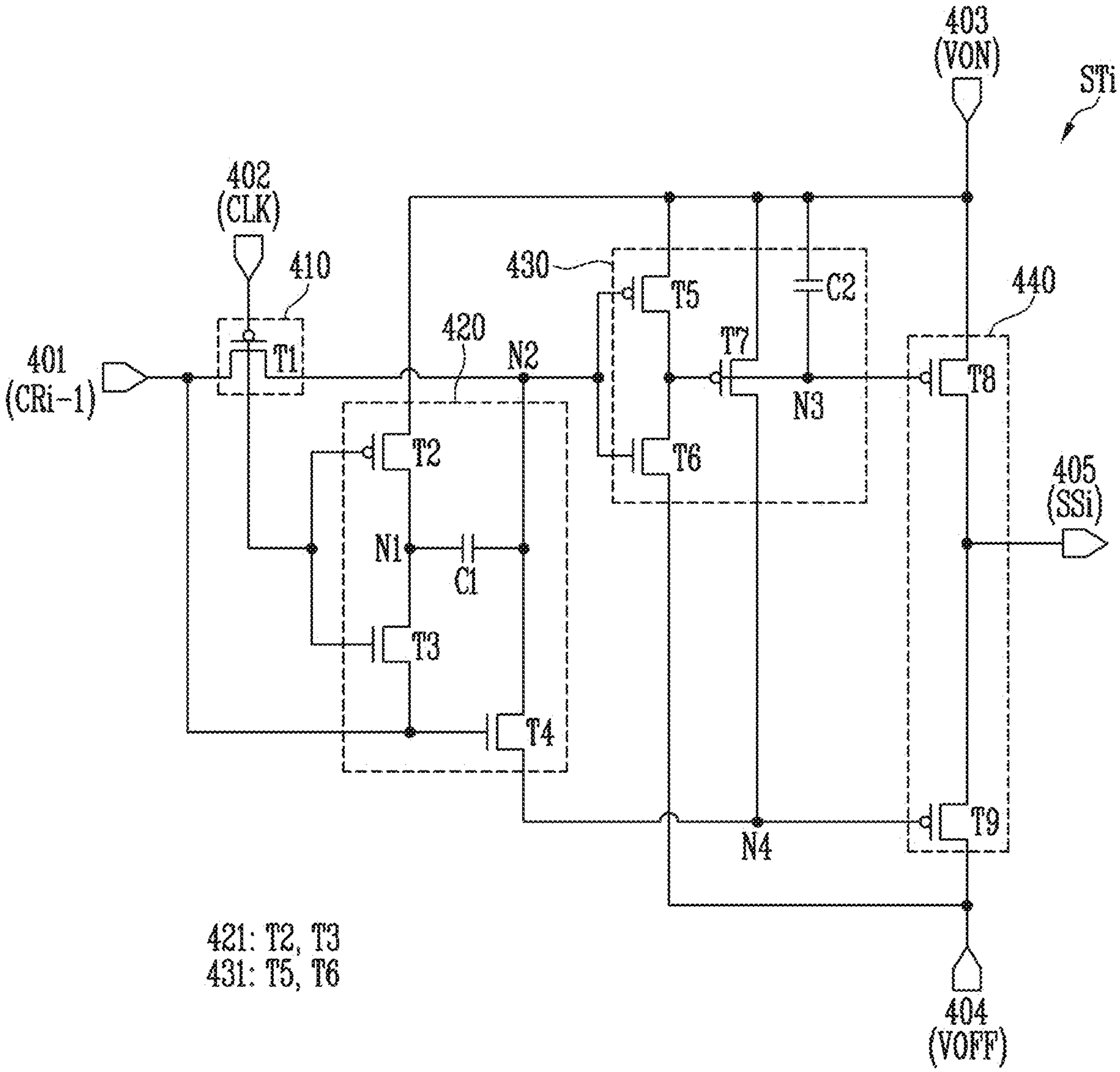
FIG. 4 is a circuit diagram illustrating an embodiment of any one of stage circuits of FIG. 3.

FIG. 4 is a circuit diagram illustrating an embodiment of any one of stage circuits of FIG. 3.

FIG. 4 describes an i-th stage circuit STi, which is one among a plurality of stage circuits ST. However, without limitation, the same may be applied to other stage circuits ST.

Referring to FIG. 4, the i-th stage circuit STi may include a first terminal 401, a second terminal 402, a third terminal 403, a fourth terminal 404, and an output terminal 405. The i-th stage circuit STi may include first to ninth transistors T1 to T9. The i-th stage circuit STi may include first and second capacitors C1 and C2.

The first terminal 401 may be input with an (i−1)-th carry signal CRi-1. In embodiments, the (i−1)-th carry signal CRi-1 may be referred to as a driving signal. According to embodiments, the (i−1)-th carry signal CRi-1 may be output from the stage circuits ST prior to the i-th stage circuit STi. The scan start signal FLM of FIG. 3 may be described similarly to the (i−1)-th carry signal CRi-1. Hereinafter, for simplicity of explanation, the description will be based on the (i−1)-th carry signal CRi-1.

The second terminal 402 may be input with a clock signal CLK.

The third terminal 403 may be input with an on-voltage VON.

The fourth terminal 404 may be input with an off-voltage VOFF. According to embodiments, the on-voltage VON may be a higher voltage than the off-voltage VOFF.

A first transistor T1 may be configured to transmit the (i−1)-th carry signal CRi-1 to a second node N2 in response to the clock signal CLK. For example, the first transistor T1 may include a first electrode connected to the first terminal 401 receiving the (i−1)-th carry signal CRi-1, a second electrode connected to the second node N2, and a gate electrode connected to the second terminal 402. When the first transistor T1 is turned on, the (i−1)-th carry signal CRi-1 may be input to the second node N2.

According to embodiments, the first transistor T1 may be a transistor including a P-type semiconductor. However, it is not necessarily limited thereto.

The second transistor T2 may be configured to transmit an on-voltage VON to a first node N1 in response to the clock signal CLK. For example, the second transistor T2 may include a first electrode connected to the third terminal 403, a second electrode connected to the first node N1, and a gate electrode connected to the second terminal 402 where the clock signal CLK is input. When the second transistor T2 is turned on, the on-voltage VON may be input to the first node N1.

The third transistor T3 may be configured to transmit a low-level voltage VGL to the first node N1 in response to the clock signal CLK. For example, the third transistor T3 may include a first electrode connected to the first node N1, a second electrode connected to the first terminal 401 where the (i−1)-th carry signal CRi-1 is input, and a gate electrode connected to the second terminal 402. When the third transistor T3 is turned on, the low-level voltage VGL may be input to the first node N1.

According to an embodiment, the second transistor T2 may be a transistor including a P-type semiconductor. The third transistor T3 may be a transistor including an N-type semiconductor.

The second transistor T2 and the third transistor T3 may be implemented as a first inverter 421. For example, the first inverter 421 may be a complementary metal-oxide semiconductor (CMOS) inverter. In embodiments, the first inverter 421 may include different types of transistors. In an embodiment, the first inverter 421 may be referred to as a first controller. However, it is not necessarily limited thereto.

The first inverter 421 may be configured to control a voltage of the first node N1 in response to the clock signal CLK. For example, the first inverter 421 may optionally input an on-voltage VON or the (i−1)-th carry signal CRi-1 to the first node N1 in response to the clock signal CLK.

A first capacitor C1 may be configured to maintain a potential difference between the first node N1 and the second node N2. For example, the first capacitor C1 may include a first electrode connected to the first node N1 and a second electrode connected to the second node N2. The first capacitor C1 may vary a voltage of the second node N2 in response to a change in a voltage of the first node N1. For example, the first capacitor C1 may be configured to increase an absolute value of the voltage of the second node N2 for a case in which an absolute value of the voltage of the first node N1 increases. The first capacitor C1 may be referred to as a boosting capacitor, or may function as such.

A fourth transistor T4 may be configured to switch an electrical connection between the second node N2 and a fourth node N4 in response to the (i−1)-th carry signal CRi-1. For example, the fourth transistor T4 may include a first electrode connected to the second node N2, a second electrode connected to the fourth node N4, and a gate electrode connected to the first terminal 401. When the fourth transistor T4 is turned on, the second node N2 and the fourth node N4 may be electrically connected.

According to embodiments, the fourth transistor T4 may be a transistor including an N-type semiconductor. However, it is not necessarily limited thereto.

A fifth transistor T5 may be configured to transmit an on-voltage VON to a third node N3 in response to a voltage of the second node N2. For example, the fifth transistor T5 may include a first electrode connected to the third terminal 403, a second electrode connected to the third node N3, and a gate electrode connected to the second node N2. When the fifth transistor T5 is turned on, the on-voltage VON may be input to the third node N3.

The sixth transistor T6 may be configured to transmit the low-level voltage VGL to the third node N3 in response to a voltage of the second node N2. For example, the sixth transistor T6 may include a first electrode connected to the third node N3, a second electrode connected to the fourth terminal 404, and a gate electrode connected to the second node N2. When the sixth transistor T6 is turned on, the low-level voltage VGL may be input to the third node N3.

According to embodiments, the fifth transistor T5 may be a transistor including a P-type semiconductor. The sixth transistor T6 may be a transistor including an N-type semiconductor.

The fifth transistor T5 and the sixth transistor T6 may be implemented as a second inverter 431. For example, the second inverter 431 may be a complementary metal-oxide semiconductor (CMOS) inverter. In embodiments, the second inverter 431 may include different types of transistors. In an embodiment, the second inverter 431 may be referred to as a second controller. However, it is not necessarily limited thereto.

The second inverter 431 may be configured to control a voltage of the third node N3 in response to a voltage of the second node N2. For example, the second inverter 431 may input an on-voltage VON or an off-voltage VOFF to the third node N3 in response to the voltage of the second node N2.

The seventh transistor T7 may be configured to switch an electrical connection between the third terminal 403 and the fourth node N4 in response to a voltage of the third node N3. For example, the seventh transistor T7 may include a first electrode connected to the third terminal 403, a second electrode connected to the fourth node N4, and a gate electrode connected to the third node N3. When the seventh transistor T7 is turned on, an on-voltage VON may be input to the fourth node N4.

According to embodiments, the seventh transistor T7 may be a transistor including a P-type semiconductor. However, it is not necessarily limited thereto.

The second capacitor C2 may be configured to maintain a voltage applied to the third node N3. For example, the second capacitor C2 may include a first electrode connected to the third terminal 403 and a second electrode connected to the third node N3. In embodiments, the second capacitor C2 may mitigate the problem of the reliability of driving of other transistors (e.g., the seventh transistor T7, an eighth transistor T8, etc.) being affected by a ripple voltage applied to the third node N3. The second capacitor C2 may be referred to as, or may function as, a stabilizing capacitor.

An eighth transistor T8 may transmit an on-voltage VON to the output terminal 405 in response to a voltage of the third node N3. For example, the eighth transistor T8 may include a first electrode connected to the third terminal 403, a second electrode connected to the output terminal 405, and a gate electrode connected to the third node N3. When the eighth transistor T8 is turned on, the on-voltage VON may be transmitted to the output terminal 405. The output terminal 405 may output an i-th scan signal SSi of a high level. According to embodiments, the i-th scan signal SSi may be the on-voltage VON. However, this is exemplary and not necessarily limited thereto.

According to embodiments, the eighth transistor T8 may be a transistor including a P-type semiconductor. However, it is not necessarily limited thereto.

A ninth transistor T9 may transmit a low-level voltage VGL to the output terminal 405 in response to a voltage of the fourth node N4. For example, the ninth transistor T9 may include a first electrode connected to the output terminal 405, a second electrode connected to the fourth terminal 404, and a gate electrode connected to the fourth node N4. When the ninth transistor T9 is turned on, an off-voltage VOFF may be transmitted to the output terminal 405. The output terminal 405 may output the i-th scan signal SSi of a low level. According to embodiments, the i-th scan signal SSi may be the off-voltage VOFF. However, this is exemplary and not necessarily limited thereto.

According to embodiments, the ninth transistor T9 may be a transistor including a P-type semiconductor. However, it is not necessarily limited thereto.

The i-th stage circuit STi may include an input part 410 configured to transmit the (i-1)-th carry signal CRi-1 to the second node N2. For example, the input part 410 may include a first transistor T1. However, it is not necessarily limited thereto, and the input part 410 may additionally include other components.

The i-th stage circuit STi may include a first signal processing part 420 configured to control a voltage of the first node N1 in response to the clock signal CLK and configured to control a voltage of the second node N2 in response to the (i−1)-th carry signal CRi-1 and a change in the voltage of the first node N1. For example, the first signal processing part 420 may selectively transmit an on-voltage VON and the (i−1)-th carry signal CRi-1 to the first node N1 in response to the clock signal CLK, and may include the first capacitor C1 connected between the first node N1 and the second node N2 and a switching element (or, the fourth transistor T4) electrically connecting the second node N2 to the fourth node N4. Further, the first signal processing part 420 may include the first inverter 421 including the second transistor T2 and the third transistor T3.

According to embodiments, the first signal processing part 420 may be connected to the input part 410 at the second node N2.

The i-th stage circuit STi may include a second signal processing part 430 configured to control a voltage of the third node N3 in response to a voltage of the second node N2. The second signal processing part 430 may include a fifth transistor T5, a sixth transistor T6, a seventh transistor T7, and a second capacitor C2.

For example, the second signal processing part 430 may include a second inverter 431 connected between the third terminal 403 and the fourth terminal 404 and selectively transmitting an on-voltage VON of the third terminal 403 and an off-voltage VOFF of the fourth terminal 404 to the third node N3 in response to the voltage of the second node N2.

According to an embodiment, the second signal processing part 430 may be connected to the input part and the first signal processing part at the second node N2. According to an embodiment, the second signal processing part 430 may be connected to the first signal processing part 420 at the fourth node N4.

The i-th stage circuit STi may include an output part 440 configured to output the i-th scan signal SSi in response to voltages of the third node N3 and the fourth node N4. For example, the output part 440 may include an eighth transistor T8 and a ninth transistor T9. According to an embodiment, the output part 440 may be connected to the second signal processing part 430 at the third node N3. According to an embodiment, the output part 440 may be connected to the first signal processing part 420 and the second signal processing part 430 at the fourth node N4.

Figure 5:
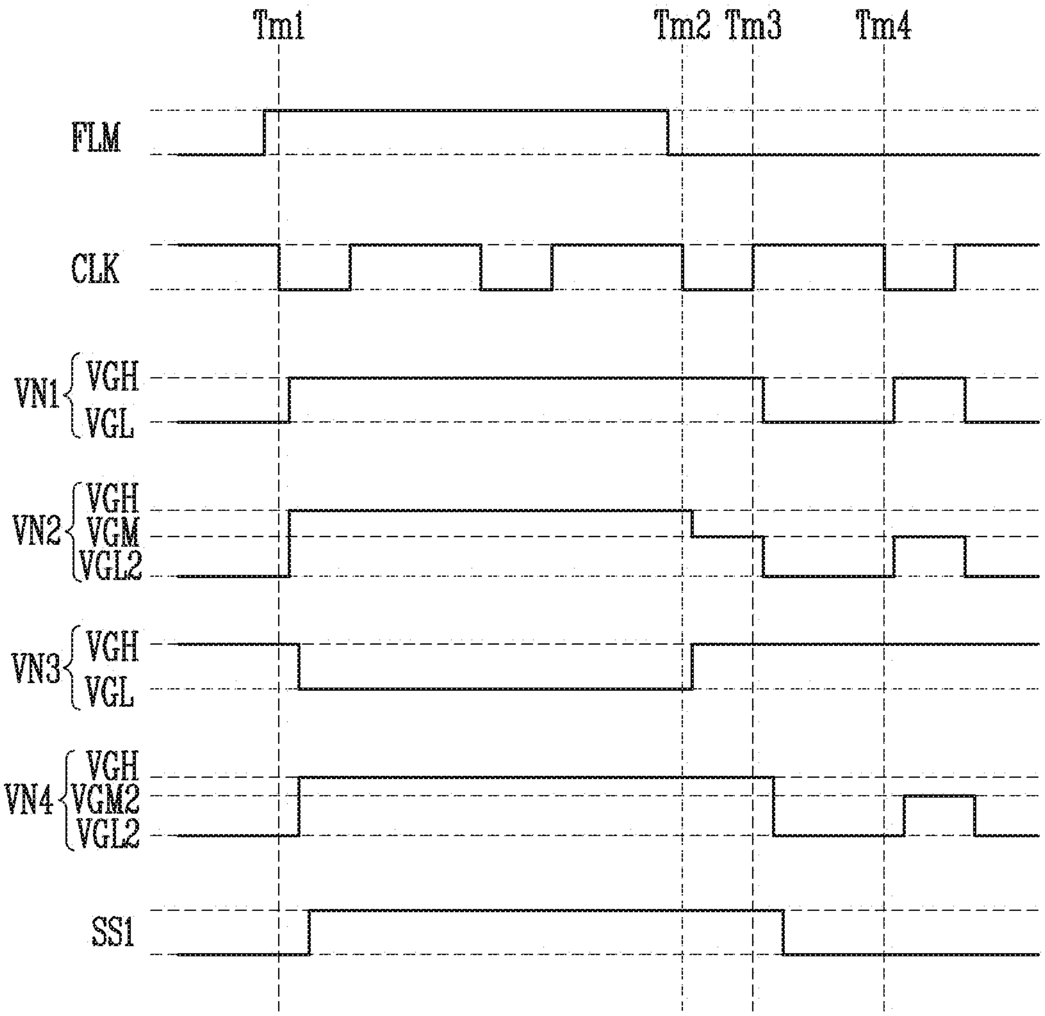
FIG. 5 is a timing diagram illustrating signals in any one of first to n-th stage circuits of FIG. 3.

FIG. 5 is a timing diagram illustrating signals in any one of first to n-th stage circuits of FIG. 3. Hereinafter, signals in the first stage circuit ST1 are described by way of example for simplicity of explanation.

In FIG. 5, a timing diagram of a scan start signal FLM, a clock signal CLK, a voltage VN1 of a first node N1, a voltage VN2 of a second node N2, a voltage VN3 of a third node N3, a voltage VN4 of a fourth node N4, and a first scan signal SS1 is shown. The voltage VN1 of the first node N1, the voltage VN2 of the second node N2, the voltage VN3 of the third node N3, and the voltage VN4 of the fourth node N4 may correspond to the voltages of the first to fourth nodes N1 to N4, respectively.

At a first time Tm1, the clock signal CLK may transition from a high level to a low level. After the scan start signal FLM transitions to a high level, the clock signal CLK may transition from a high level to a low level.

As the clock signal CLK transitions to a low level, the voltage VN1 of the first node N1 may transition from a low-level voltage VGL to a high-level voltage VGH. The second transistor T2 may turn on in response to the clock signal CLK of a low level, thereby transmitting the on-voltage VON of the third terminal 403 to the first node N1. Accordingly, the voltage VN1 of the first node N1 transitions from the low-level voltage VGL to the high-level voltage VGH.

As the clock signal CLK transitions to a low level, the voltage VN2 of the second node N2 may transition to the high-level voltage VGH. The first transistor T1 may turn on in response to the clock signal CLK of a low level to transmit the scan start signal FLM of the first terminal 401 to the second node N2. Accordingly, the voltage VN2 of the second node N2 is changed to the high-level voltage VGH.

As the voltage VN2 of the second node N2 changes to the high-level voltage VGH, the voltage VN3 of the third node N3 may transition from the high-level voltage VGH to the low-level voltage VGL. The sixth transistor T6 may turn on in response to the voltage VN2 of the second node N2 changing to the high-level voltage VGH, thereby transmitting the off-voltage VOFF of the fourth terminal 404 to the third node N3. Accordingly, the voltage VN3 of the third node N3 changes to the low-level voltage VGL. According to an embodiment, the low-level voltage VGL may be substantially equal to the off-voltage VOFF. However, this is exemplary and not necessarily limited thereto.

As the voltage VN3 of the third node N3 transitions from the high-level voltage VGH to the low-level voltage VGL, the voltage VN4 of the fourth node N4 may change to the high-level voltage VGH. The seventh transistor T7 may turn on in response to the voltage VN3 of the third node N3 changing to the low-level voltage VGL, thereby transmitting the on-voltage VON of the third terminal 403 to the fourth node N4. Accordingly, the voltage VN4 of the fourth node N4 may be transitioned to the high-level voltage VGH. According to an embodiment, the high-level voltage VGH may be the same as the on-voltage VON. However, this is exemplary and not necessarily limited thereto.

The first scan signal SS1 may output a high-level signal in response to the voltage VN3 of the third node N3. For example, the eighth transistor T8 may turn on in response to the voltage VN3 of the third node N3 having the low-level voltage VGL, thereby transmitting the on-voltage VON of the third terminal 403 to the output terminal 405. Accordingly, the first stage circuit ST1 (see FIG. 1) may output the first scan signal SS1 having a high level.

The output terminal 405 may output the first scan signal SS1 to the first gate line GL1 (see FIG. 1). According to an embodiment, the first scan signal SS1 may be transmitted to a second stage circuit ST2, which is a next stage, as a first carry signal CR1. Compared to the first stage circuit ST1, the second stage circuit ST2 receives the first carry signal CR1 instead of the scan start signal FLM. The second stage circuit ST2 may operate similarly to the first stage circuit ST1 described with reference to FIG. 5 in response to the first carry signal CR1. Similarly, the i-th stage circuit STi (where i is an integer greater than 0 and less than or equal to n) may operate similarly to the first stage circuit ST1 described with reference to FIG. 5 in response to the i-th carry signal CRi-1. Hereinafter, redundant descriptions are omitted. Herein, when redundant descriptions are said to be omitted, this means that to the extent that subsequent stages ST2, STi etc is not described in detail, it may be understood that subsequent stages ST2, STi, etc are at least similar to the first stage ST1 that has been described previously in the present disclosure.

At a second time Tm2, the clock signal CLK may transition from a high level to a low level. After the scan start signal FLM transitions to a low level, the clock signal CLK may transition from a high level to a low level.

In response to the clock signal CLK of a low level, the second transistor T2 is turned on. The on-voltage VON of the third terminal 403 may be transmitted to the first node N1, and the voltage VN1 of the first node N1 may be maintained at the high-level voltage VGH.

As the clock signal CLK transitions to a low level, the voltage VN2 of the second node N2 may transition from the high-level voltage VGH to a middle-level voltage VGM. The first transistor T1 may turn on in response to the clock signal CLK of a low level to transmit the scan start signal FLM of the first terminal 401 to the second node N2.

Accordingly, the voltage VN2 of the second node N2 may decrease from the high-level voltage VGH to the middle-level voltage VGM.

The middle-level voltage VGM may be lower than the high-level voltage VGH. According to an embodiment, the middle-level voltage VGM may be the sum of the low-level voltage VGL and a threshold voltage of the first transistor T1. However, this is exemplary and not necessarily limited thereto.

As the voltage VN2 of the second node N2 decreases to the middle-level voltage VGM, the voltage VN3 of the third node N3 may increase. For example, the fifth transistor T5 may turn on as the voltage VN2 of the second node N2 transitions to the middle-level voltage VGM, thereby transmitting the on-voltage VON of the third terminal 403 to the third node N3. Accordingly, the voltage VN3 at the third node N3 may transition to the high-level voltage VGH.

At a third time Tm3, the clock signal CLK may transition from a low level to a high level.

As the clock signal CLK transitions to a high level, the voltage VN1 of the first node N1 may transition from the high-level voltage VGH to the low-level voltage VGL. For example, the third transistor T3 may turn on in response to the clock signal CLK, and the scan start signal FLM of a low-level may be transmitted to the first node N1. Accordingly, the voltage VN1 of the first node N1 may decrease. For example, the voltage VN1 of the first node N1 may decrease from the high-level voltage VGH to the low-level voltage VGL.

As the voltage VN1 of the first node N1 transitions to the low-level voltage VGL, the voltage VN2 of the second node N2 may further decrease to a second low-level voltage VGL2. A change in the voltage VN1 of the first node N1 may be transmitted to the second node N2 via the first capacitor C1. For example, a decrease in the voltage VN1 of the first node N1 may be transmitted to the second node N2 via a voltage coupling of the first capacitor C1, such that the voltage VN2 of the second node N2 may decrease from the middle-level voltage VGM to the second low-level voltage VGL2.

The second low-level voltage VGL2 may be lower than the middle-level voltage VGM. Further, a value of the second low-level voltage VGL2 may be lower than a voltage of the scan start signal FLM of a low-level. According to an embodiment, the second low-level voltage VGL2 may be a value twice the low-level voltage VGL. However, this is exemplary and not necessarily limited thereto.

As the voltage VN2 of the second node N2 decreases to the second low-level voltage VGL2, the voltage VN4 of the fourth node N4 may decrease to the second low-level voltage VGL2. For example, the fourth transistor T4 may be driven in response to a difference value between a voltage input to a gate electrode of the fourth transistor T4 and a voltage input to a source electrode of the fourth transistor T4. The scan start signal FLM of a low-level may be input to the gate electrode of the fourth transistor T4. The second low-level voltage VGL2 may be input to a first electrode of the fourth transistor T4 connected to the second node N2. The high-level voltage VGH may be input to a second electrode of the fourth transistor T4 connected to the fourth node N4. A value obtained by subtracting the second low-level voltage VGL2, which is the voltage VN2 of the second node N2, from the scan start signal FLM of a low-level may be greater than a threshold voltage of the fourth transistor T4. Accordingly, the fourth transistor T4 may turn on. The fourth transistor T4 which is turned on may transmit the voltage VN2 of the second node N2 to the fourth node N4, and the voltage VN4 of the fourth node N4 may decrease to the second low-level voltage VGL2.

As the voltage VN4 of the fourth node N4 decreases to the second low-level voltage VGL2, the first scan signal SS1 may transition from a high level to a low level. For example, the ninth transistor T9 may turn on as the voltage VN4 of the fourth node N4 decreases to the second low-level voltage VGL2. Further, the eighth transistor T8 may turn off in response to the voltage VN3 of the third node N3 having the high-level voltage VGH. Accordingly, the ninth transistor T9 may transmit an off-voltage VOFF to the output terminal 405, and the first stage circuit ST1 (see FIG. 1) may output the first scan signal SS1 having a low level.

According to an embodiment of the disclosure, the voltage VN2 of the second node N2 is changed to the second low-level voltage VGL2 in response to a change in the voltage VN1 of the first node N1, and the second low-level voltage VGL2 is transmitted from the second node N2 to the fourth node N4. The second low-level voltage VGL2 is lower than the low-level voltage VGL, and thus the second low-level voltage VGL2 corresponds to a low voltage level. Accordingly, the ninth transistor T9 may be reliably turned on, and a low-level voltage of the first scan signal SS1 may be reliably provided. For example, the off-voltage VOFF of the first scan signal SS1 may be reliably provided.

At a fourth time Tm4, the clock signal CLK may transition from a high level to a low level. As the clock signal CLK transitions to a low level, the voltage VN1 of the first node N1 may transition from the low-level voltage VGL to the high-level voltage VGH. For example, the second transistor T2 may turn on in response to the clock signal CLK and transmit the on-voltage VON to the first node N1. Accordingly, the voltage VN1 of the first node N1 may increase.

As the clock signal CLK transitions to a low level, the voltage VN2 of the second node N2 may transition from the second low-level voltage VGL2 to the middle-level voltage VGM. For example, the first transistor T1 may turn on in response to the clock signal CLK and may transmit the scan start signal FLM of a low-level to the second node N2. Accordingly, the voltage VN2 of the second node N2 may increase, and may have a value of the middle-level voltage VGM.

The voltage VN2 of the second node may be transmitted to the fourth node N4 via the fourth transistor T4 which is turned on. According to the middle-level voltage VGM of the second node N2, the voltage VN4 of the fourth node N4 may change to a second middle-level voltage VGM2. The second middle-level voltage VGM2 may be a voltage level suitable for maintaining the turn-on of the ninth transistor T9.

According to an embodiment, the second middle-level voltage VGM2 may be the same value as the middle-level voltage VGM. However, this is exemplary and not necessarily limited thereto.

According to an embodiment of the disclosure, the voltage VN2 of the second node N2 may be switched between the second low-level voltage VGL2 and the middle-level voltage VGM in response to the clock signal CLK. The voltage VN4 of the fourth node N4 may be switched between the second low-level voltage VGL2 and the middle-level voltage VGM in response to a change in the voltage VN2 of the second node N2. This may mean that the voltage VN4 of the fourth node N4 is periodically refreshed. Accordingly, the voltage VN4 of the fourth node N4 may be controlled stably, and the reliability of driving the ninth transistor T9 connected to the fourth node N4 may be improved.

According to embodiments of the disclosure, a stage circuit ST for a display scan driver 120 is disclosed that includes inverters, capacitors and transistors, where a boosting capacitor C1 is included between two nodes N1 and N2 to decrease a voltage at a second node N2 according to a voltage across the capacitor. The decreased voltage is transferred to a fourth node N4 to reliably turn on an output transistor T9 so that a low voltage VOFF can be reliably output to the scan line SSi.

Figure 6:
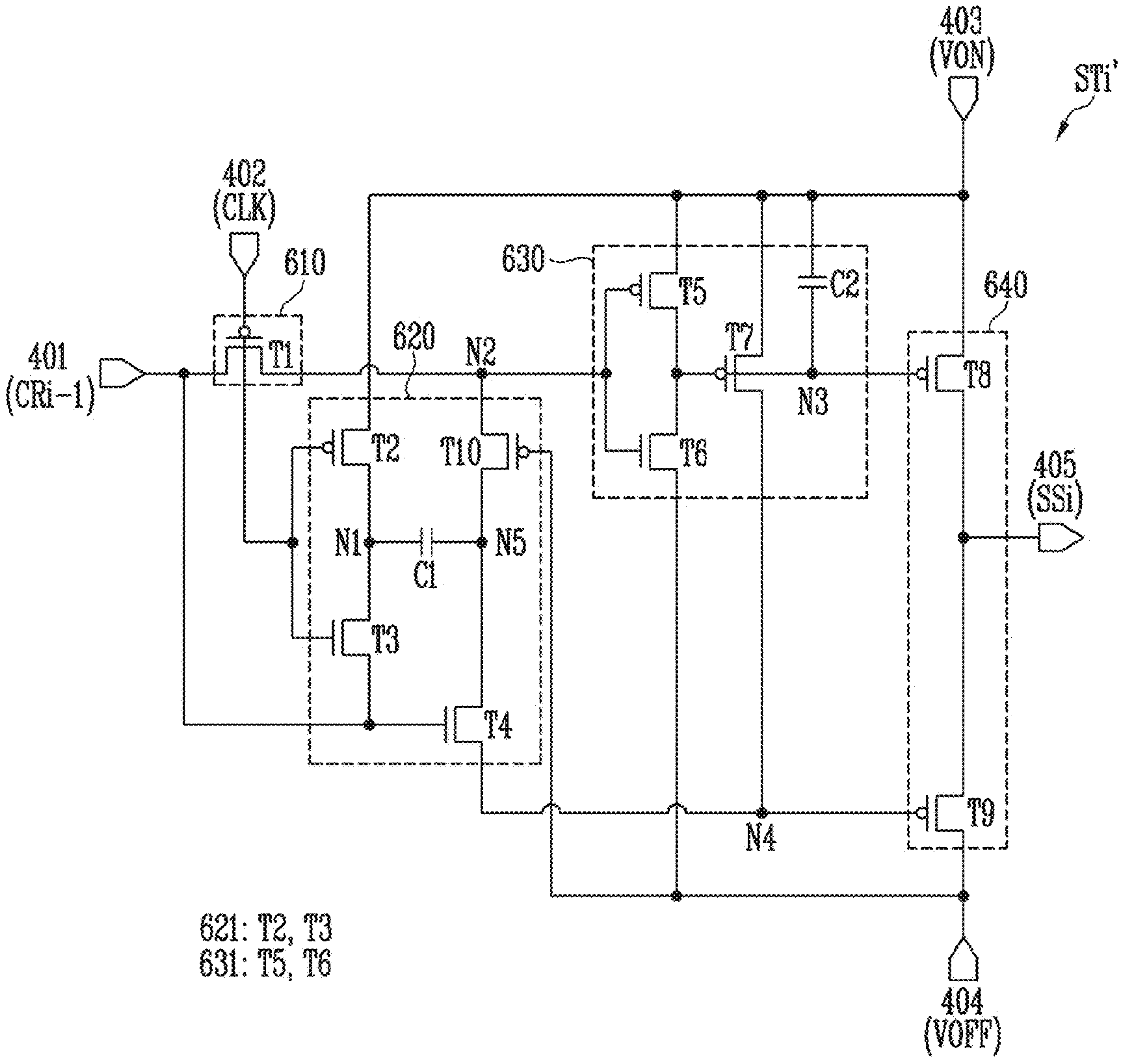
FIG. 6 is a circuit diagram illustrating an embodiment of any one of the stage circuits of FIG. 3.

FIG. 6 is a circuit diagram illustrating an embodiment of any one of the stage circuits of FIG. 3.

An i-th stage circuit STi' of FIG. 6 may further include a tenth transistor T10 with respect to the i-th stage circuit STi of FIG. 4. The remaining configurations of the i-th stage circuit STi' of FIG. 6 may be described similarly to the i-th stage circuit STi of FIG. 4. Hereinafter, redundant descriptions are omitted.

Referring to FIG. 6, the tenth transistor T10 may switch an electrical connection between the second node N2 and the fifth node N5 in response to the off-voltage VOFF. For example, the tenth transistor T10 may include a first electrode connected to the second node N2, a second electrode connected to the fifth node N5, and a gate electrode connected to the fourth terminal 404. When the tenth transistor T10 is turned on, the second node N2 and the fifth node N5 may be electrically connected.

The i-th stage circuit STi' may include an input part 610, a first signal processing part 620, a second signal processing part 630, and an output part 640. The input part 610, the second signal processing part 630, and the output part 640 of FIG. 6 may be described similarly to the input part 410, the second signal processing part 430, and the output part 440 of FIG. 4, respectively. Hereinafter, redundant descriptions are omitted.

According to an embodiment, the first signal processing part 620 may include a second transistor T2, a third transistor T3, a first capacitor C1, a fourth transistor T4, and a tenth transistor T10. The second transistor T2, the third transistor T3, the first capacitor C1, and the fourth transistor T4 of FIG. 6 may be described similarly to the second transistor T2, the third transistor T3, the first capacitor C1, and the fourth transistor T4 of FIG. 4.

According to embodiments, the first signal processing part 620 may prevent the voltage of the second node N2 from becoming excessively high or low. For example, the voltage of the second node N2 may change in response to a change in the voltage of the first node N1. In other words, the voltage of the second node N2 may be boosted by the first capacitor C1. The voltage of the second node N2 may unintentionally become excessively high or low, and electrical and/or thermal damage may be inflicted on a transistor connected to the second node N2 (e.g., the first transistor T1). The tenth transistor T10 may be connected between the second node N2 and the fifth node N5 to prevent the risk of electrical and/or thermal damage to the first transistor T1.

Therefore, a first signal processing part 620 that includes the first node N1 and the boosting capacitor C1 may also include another transistor T10 to prevent the voltage at the second node N2 from becoming excessively too high or too low to prevent thermal damage to the transistors, thereby further enhancing reliability of the scan driver 120.

Figure 7:
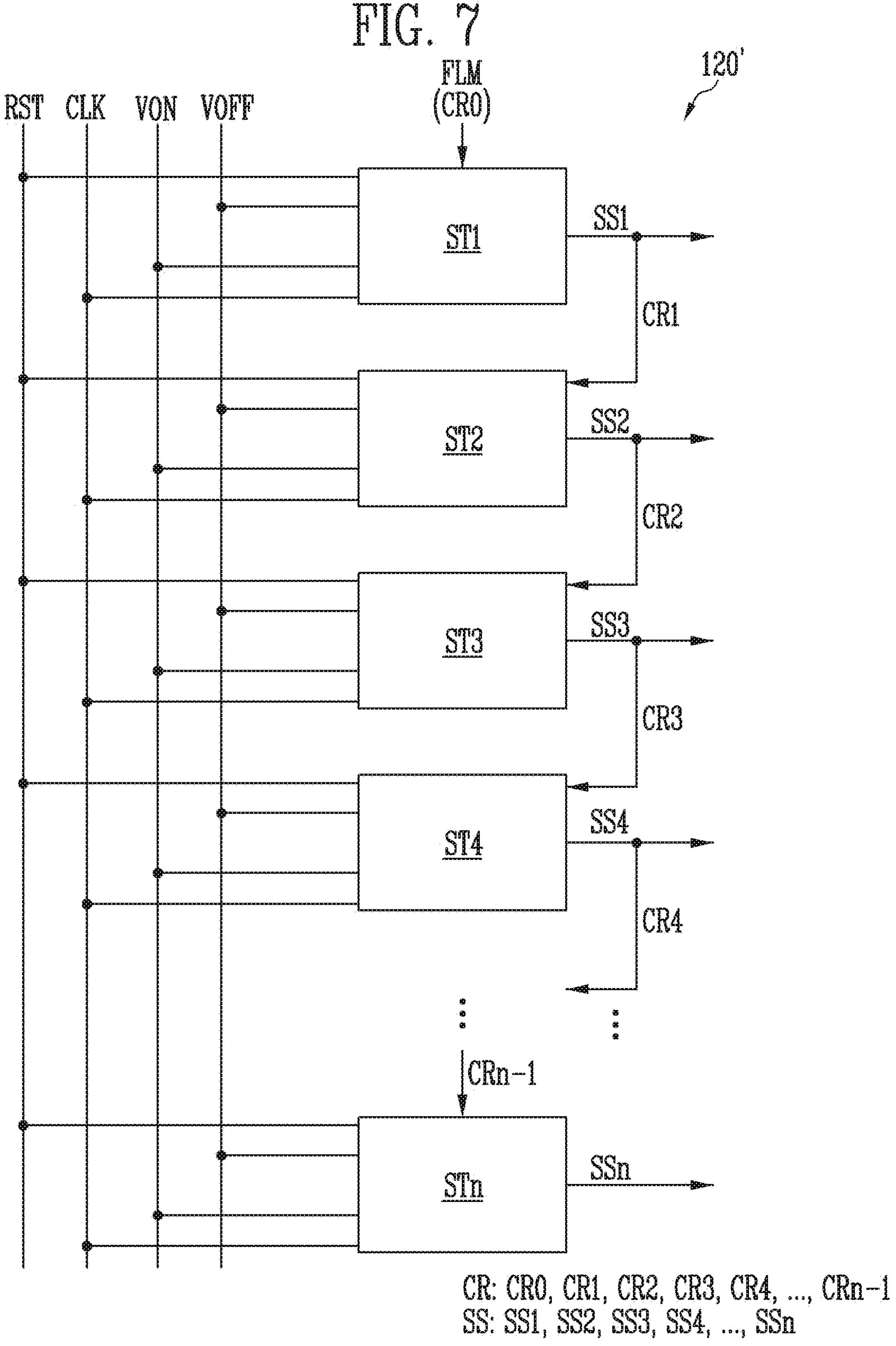
FIG. 7 is a block diagram illustrating an embodiment of the gate driver of FIG. 1.

FIG. 7 is a block diagram illustrating an embodiment of the gate driver of FIG. 1.

A configuration and signals of a gate driver 120', except for a reset signal RST of FIG. 7, may be described similarly to the configuration and signals of the gate driver 120 of FIG. 3. Hereinafter, redundant descriptions are omitted.

Referring to FIG. 7, the gate driver 120' may include each of multiple stage circuits ST. Each of the first to n-th stage circuits ST1 to STn may receive the reset signal RST. When the first to n-th stage circuits ST1 to STn are supplied with the reset signal RST, the at least one node included in each of the first to n-th stage circuits ST1 to STn may be initialized. According to embodiments, the reset signal RST may be supplied when power is applied, or every plurality of frame periods.

FIGS. 8 to 15 are circuit diagrams illustrating embodiments of any one of stage circuits included in the gate driver of FIG. 7.

Figure 8:
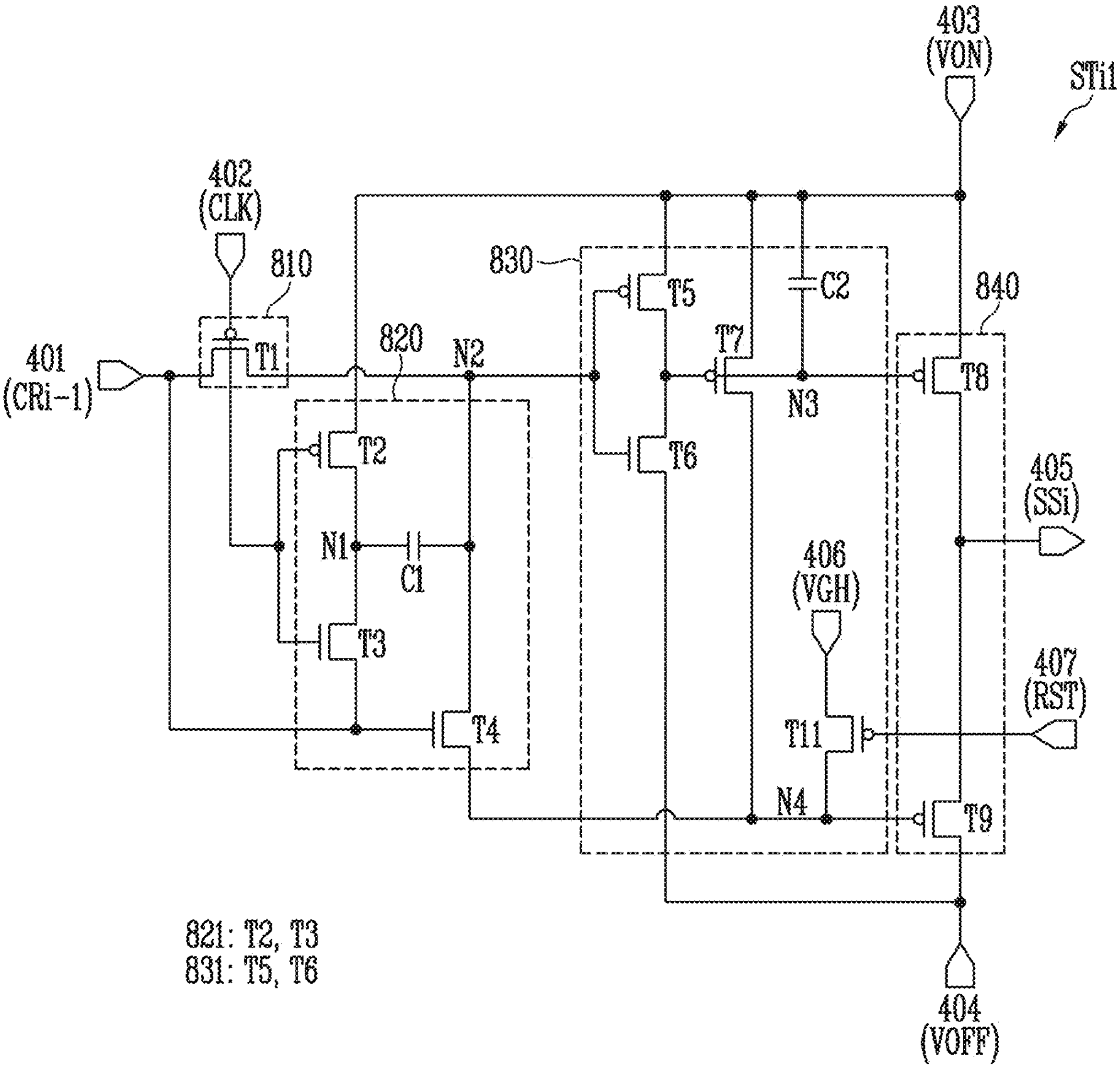
FIGS. 8 to 15 are circuit diagrams illustrating embodiments of any one of stage circuits included in the gate driver of FIG. 7.

First, referring to FIG. 8, an i1-th stage circuit STi1 may include an input part 810, a first signal processing part 820, a second signal processing part 830, and an output part 840. Each of the input part 810, the first signal processing part 820, and the output part 840 of FIG. 8 may be described similarly to the input part 410, the first signal processing part 420, and the output part 440 of FIG. 4. Further, a first inverter 821 and a second inverter 831 of FIG. 8 may be described similarly to the first inverter 421 and the second inverter 431 of FIG. 4. Hereinafter, redundant descriptions are omitted.

According to an embodiment, the second signal processing part 830 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 8 may be described similarly to the fifth transistor T5, the sixth transistor T6, the second capacitor C2, and the seventh transistor T7 of FIG. 4.

According to an embodiment of the disclosure, the second signal processing part 830 may be configured to initialize the fourth node N4 in response to the reset signal RST. For example, the eleventh transistor T11 may initialize the voltage of the fourth node N4 in response to the reset signal RST. For example, the eleventh transistor T11 may include a first electrode connected to an additional terminal 406 that receives the high-level voltage VGH, a second electrode connected to the fourth node N4, and a gate electrode connected to a reset terminal 407 that receives the reset signal RST. When the eleventh transistor T11 is turned on, the high-level voltage VGH may be input to the fourth node N4. Accordingly, the fourth node N4 may be initialized with the input of the high-level voltage VGH at set time intervals, and the reliability of driving the i1-th stage circuit STi1 (or, the ninth transistor T9) may be improved.

In some embodiments, the high-level voltage VGH input from the additional terminal 406 may be the same as the on-voltage VON. However, this is exemplary and not necessarily limited thereto.

Figure 9:
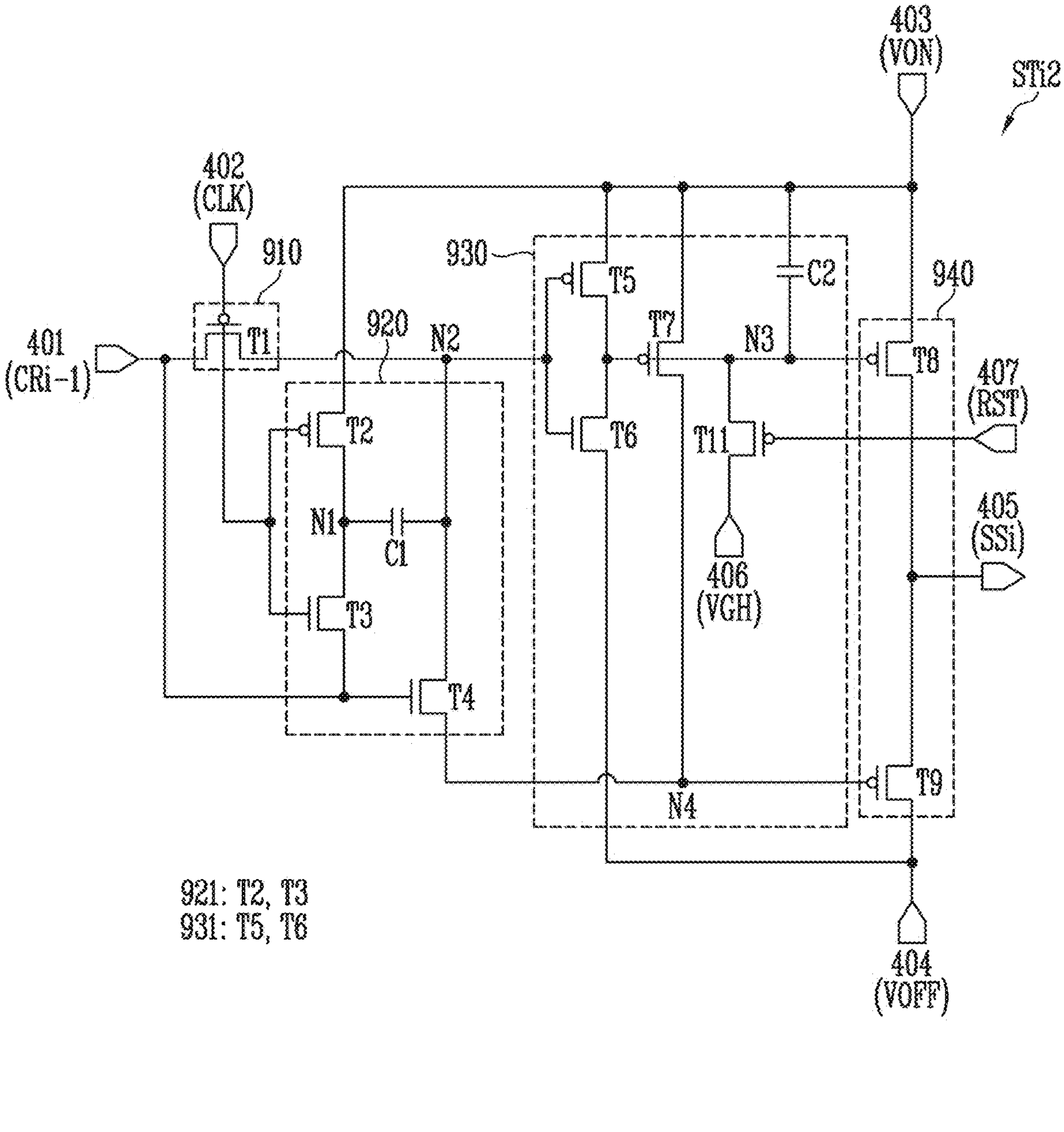

Referring to FIG. 9, an i2-th stage circuit STi2 may include an input part 910, a first signal processing part 920, a second signal processing part 930, and an output part 940. Each of the input part 910, the first signal processing part 920, and the output part 940 of FIG. 9 may be described similarly to the input part 410, the first signal processing part 420, and the output part 440 of FIG. 4. Further, a first inverter 921 and a second inverter 931 of FIG. 9 may be described similarly to the first inverter 421 and the second inverter 431 of FIG. 4. Hereinafter, redundant descriptions are omitted.

According to an embodiment, the second signal processing part 930 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 9 may be described similarly to the fifth transistor T5, the sixth transistor T6, the second capacitor C2, and the seventh transistor T7 of FIG. 4.

According to an embodiment of the disclosure, the second signal processing part 930 may be configured to initialize the third node N3 in response to the reset signal RST. For example, the eleventh transistor T11 may initialize the voltage of the third node N3 in response to the reset signal RST. For example, the eleventh transistor T11 may include a first electrode connected to an additional terminal 406 that receives the high-level voltage VGH, a second electrode connected to the fourth node N4, and a gate electrode connected to a reset terminal 407 that receives the reset signal RST. When the eleventh transistor T11 is turned on, the high-level voltage VGH may be input to the third node N3. Accordingly, the third node N3 may be initialized with the input of the high-level voltage VGH at a set time interval, and the reliability of driving the i2-th stage circuit STi2 (or, the eighth transistor T8) may be improved.

Figure 10:
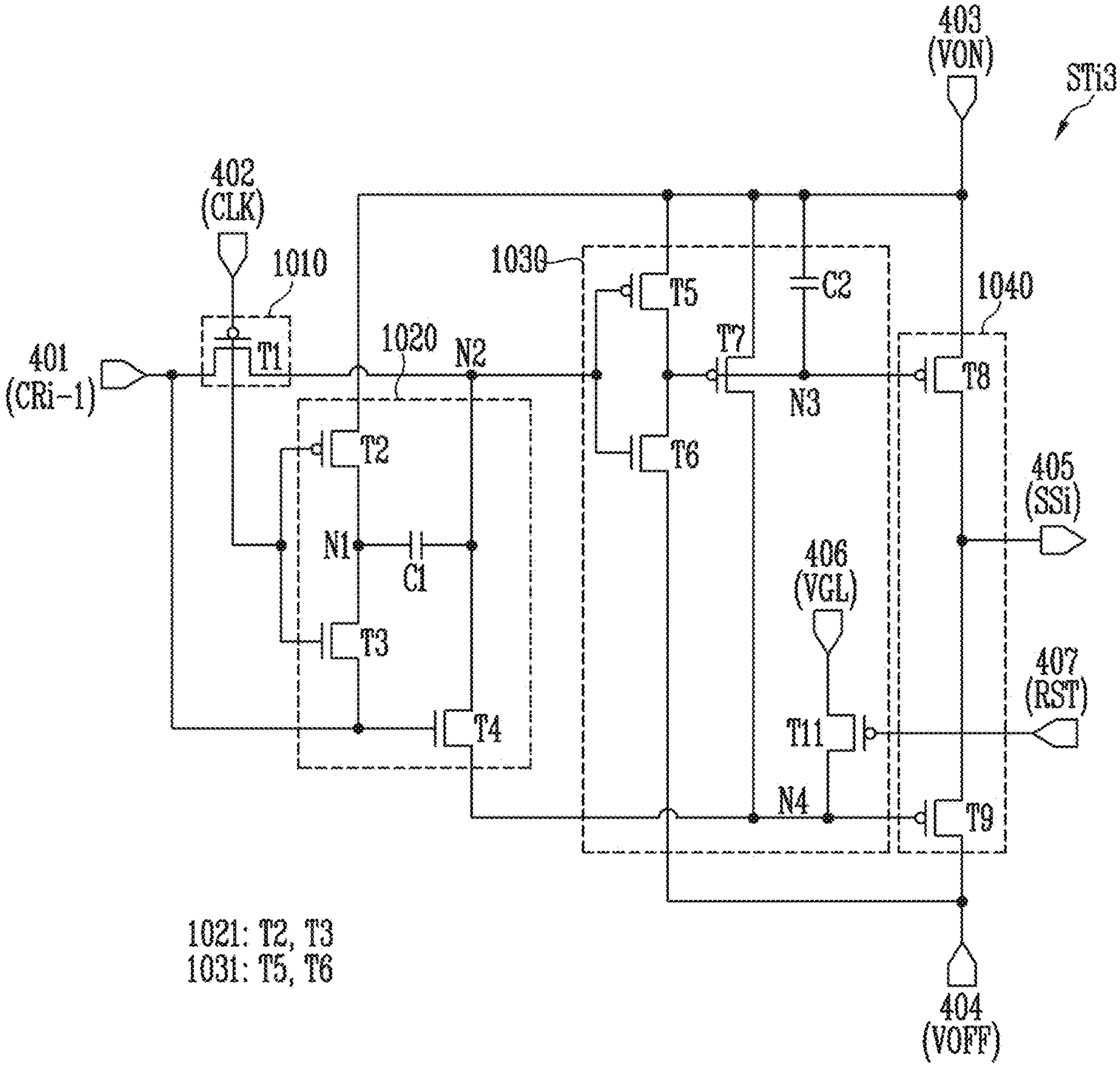

Referring to FIG. 10, an i3-th stage circuit STi3 may include an input part 1010, a first signal processing part 1020, a second signal processing part 1030, and an output part 1040. Each of the input part 1010, the first signal processing part 1020, and the output part 1040 of FIG. 10 may be described similarly to the input part 410, the first signal processing part 420, and the output part 440 of FIG. 4. Further, a first inverter 1021 and a second inverter 1031 of FIG. 10 may be described similarly to the first inverter 421 and the second inverter 431 of FIG. 4. Hereinafter, redundant descriptions are omitted.

According to an embodiment, the second signal processing part 1030 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 10 may be described similarly to the fifth transistor T5, the sixth transistor T6, the second capacitor C2, and the seventh transistor T7 of FIG. 4.

According to an embodiment of the disclosure, the second signal processing part 1030 may be configured to initialize the fourth node N4 in response to the reset signal RST. For example, the eleventh transistor T11 may initialize the voltage of the fourth node N4 in response to the reset signal RST. For example, the eleventh transistor T11 may include a first electrode connected to an additional terminal 406 that receives the low-level voltage VGL, a second electrode connected to the fourth node N4, and a gate electrode connected to a reset terminal 407 that receives the reset signal RST. When the eleventh transistor T11 is turned on, the low-level voltage VGL may be input to the fourth node N4. According to embodiments of the disclosure, the fourth node N4 may be initialized by receiving the low-level voltage VGL at set time intervals, and the reliability of driving the i3-th stage circuit STi3 (or, the ninth transistor T9) may be improved.

According to embodiments, the low-level voltage VGL input from the additional terminal 406 may be substantially equal to the off-voltage VOFF. However, this is exemplary and not necessarily limited thereto.

Figure 11:
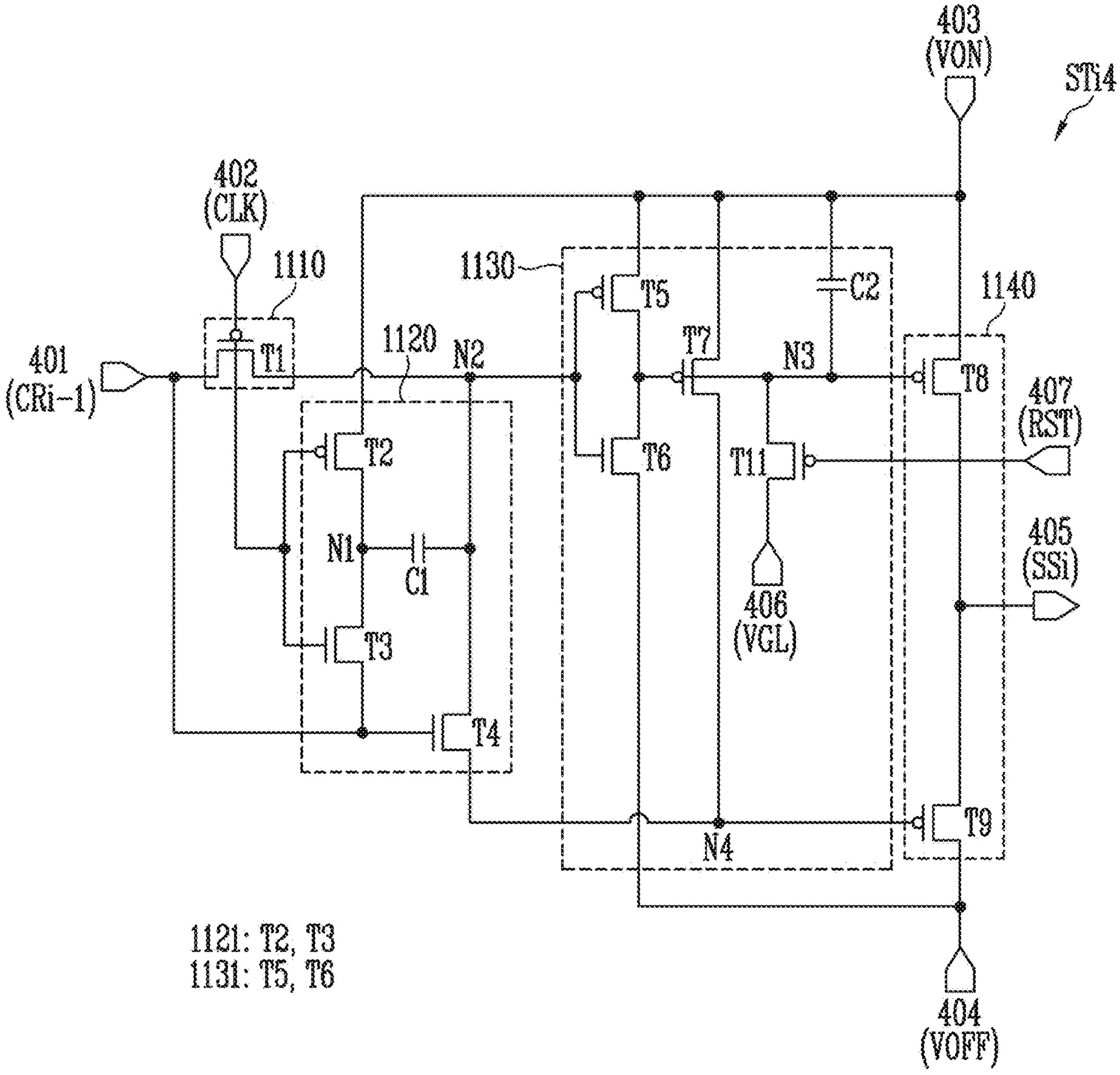

Referring to FIG. 11, an i4-th stage circuit STi4 may include an input part 1110, a first signal processing part 1120, a second signal processing part 1130, and an output part 1140. Each of the input part 1110, the first signal processing part 1120, and the output part 1140 of FIG. 9 may be described similarly to the input part 410, the first signal processing part 420, and the output part 440 of FIG. 4. Hereinafter, redundant descriptions are omitted.

According to an embodiment, the second signal processing part 1130 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 11 may be described similarly to the fifth transistor T5, the sixth transistor T6, the second capacitor C2, and the seventh transistor T7 of FIG. 4. Also, a first inverter 1121 and a second inverter 1131 of FIG. 11 may be described in the same way as the first inverter 421 and the second inverter 431 of FIG. 4.

According to embodiments of the disclosure, the second signal processing part 1130 may be configured to initialize the third node N3 in response to the reset signal RST. For example, the eleventh transistor T11 may initialize the voltage of the third node N3 in response to the reset signal RST. For example, the eleventh transistor T11 may include a first electrode connected to the third node N3, a second electrode connected to an additional terminal 406 that receives the low-level voltage VGL, and a gate electrode connected to a reset terminal 407 that receives the reset signal RST. When the eleventh transistor T11 is turned on, the low-level voltage VGL may be input to the third node N3. According to an embodiment of the disclosure, the third node N3 may be initialized by receiving the low-level voltage VGL at a set time interval, and the reliability of driving the i4-th stage circuit STi4 (or, the eighth transistor T8) may be improved.

Referring to FIGS. 12 to 15, i5-th to i8-th stage circuits STi5 to STi8 are shown.

Figure 12:
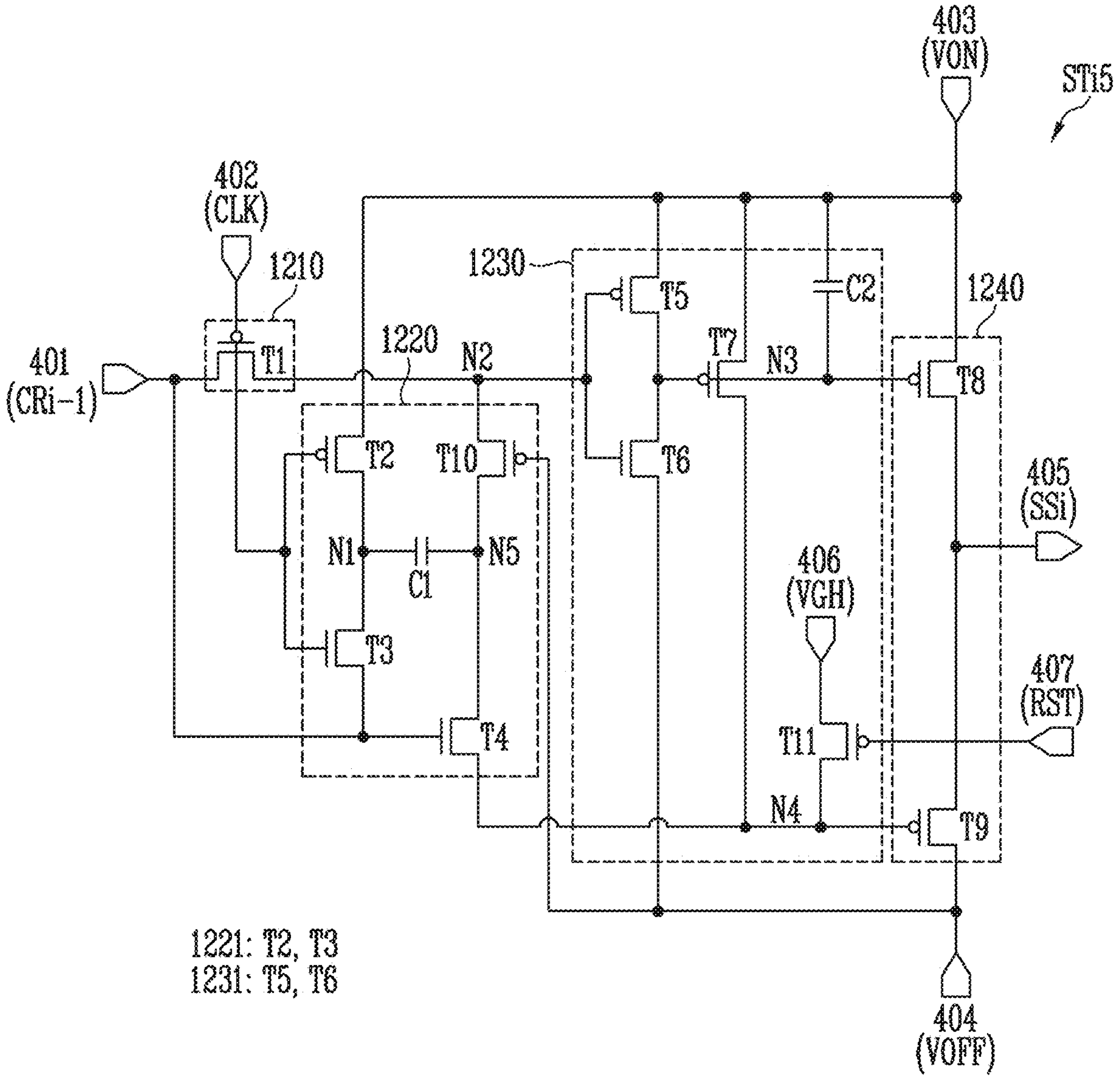

Referring to FIG. 12, the i5-th stage circuit STi5 may include an input part 1210, a first signal processing part 1220, a second signal processing part 1230, and an output part 1240. Each of the input part 1210 and the output part 1240 of FIG. 12 may be described similarly to the input part 410 and the output part 440 of FIG. 4. Further, a first inverter 1221 and a second inverter 1231 of FIG. 12 may be described similarly to the first inverter 421 and the second inverter 431 of FIG. 4. Hereinafter, redundant descriptions are omitted.

According to an embodiment, the first signal processing part 1220 may include a second transistor T2, a third transistor T3, a first capacitor C1, a fourth transistor T4, and a tenth transistor T10. The second transistor T2, the third transistor T3, the first capacitor C1, and the fourth transistor T4 of FIG. 12 may be described similarly to the second transistor T2, the third transistor T3, the first capacitor C1, and the fourth transistor T4 of FIG. 4. Further, the tenth transistor T10 of FIG. 12 may be described similarly to the tenth transistor T10 of FIG. 6. Hereinafter, redundant descriptions are omitted.

According to an embodiment, the second signal processing part 1230 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 12 may be described similarly to the fifth transistor T5, the sixth transistor T6, the second capacitor C2, and the seventh transistor T7 of FIG. 4. Further, the eleventh transistor T11 of FIG. 12 may be described similarly to the eleventh transistor T11 of FIG. 8. Hereinafter, redundant descriptions are omitted.

Figure 13:
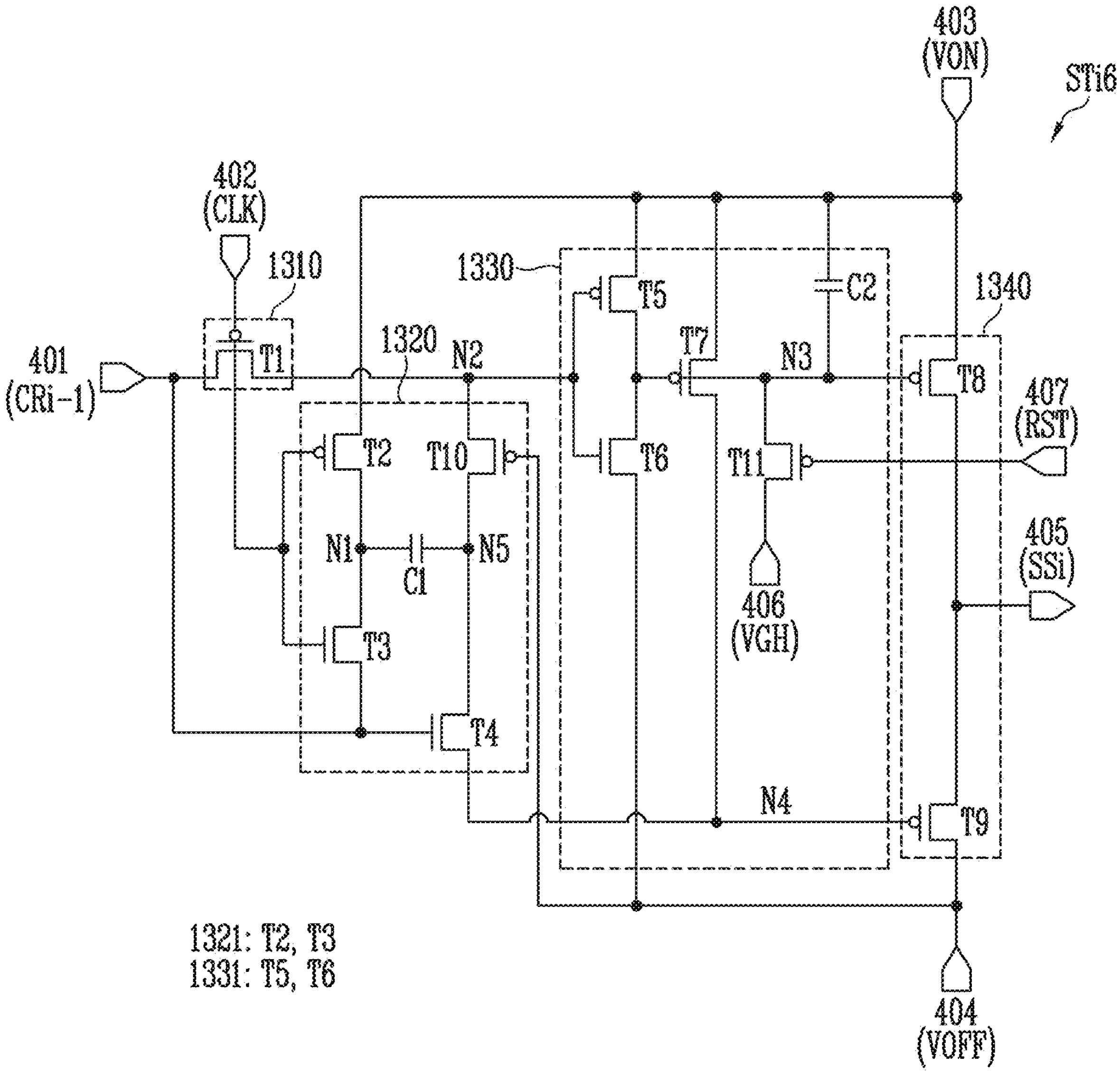

Referring to FIG. 13, the i6-th stage circuit STi6 may include an input part 1310, a first signal processing part 1320, a second signal processing part 1330, and an output part 1340. The input part 1310 and the output part 1340 of FIG. 13 may be described similarly to the input part 410 and the output part 440 of FIG. 4, respectively. Further, a first inverter 1321 and a second inverter 1331 of FIG. 13 may be described similarly to the first inverter 421 and the second inverter 431 of FIG. 4. Hereinafter, redundant descriptions are omitted.

According to an embodiment, the first signal processing part 1320 may include a second transistor T2, a third transistor T3, a first capacitor C1, a fourth transistor T4, and a tenth transistor T10. The second transistor T2, the third transistor T3, the first capacitor C1, and the fourth transistor T4 of FIG. 13 may be described similarly to the second transistor T2, the third transistor T3, the first capacitor C1, and the fourth transistor T4 of FIG. 4. Further, the tenth transistor T10 of FIG. 13 may be described similarly to the tenth transistor T10 of FIG. 6. Hereinafter, redundant descriptions are omitted.

According to an embodiment, the second signal processing part 1330 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 13 may be described similarly to the fifth transistor T5, the sixth transistor T6, the second capacitor C2, and the seventh transistor T7 of FIG. 4. Further, the eleventh transistor T11 of FIG. 13 may be described similarly to the eleventh transistor T11 of FIG. 9. Hereinafter, redundant descriptions are omitted.

Figure 14:
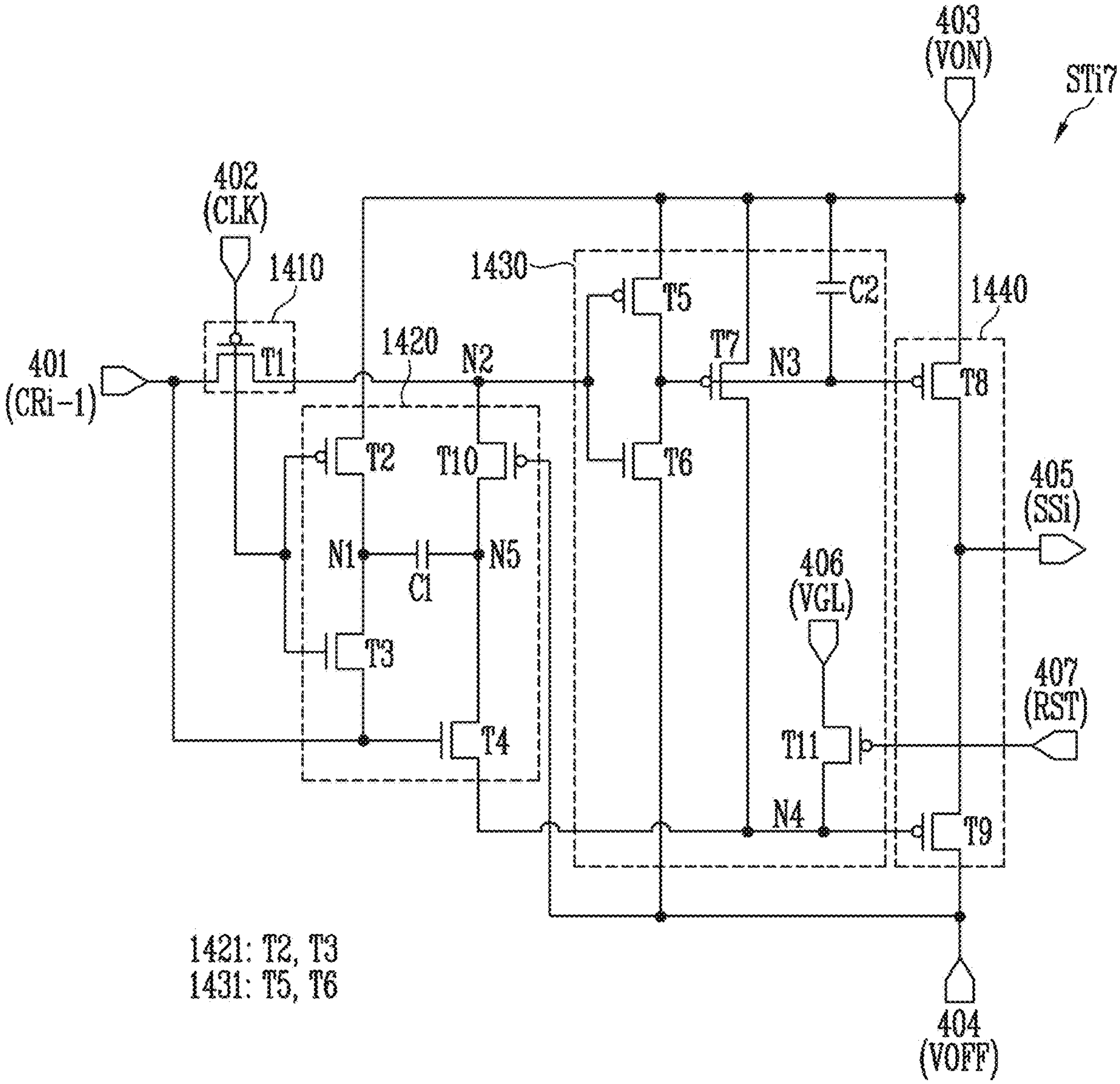

Referring to FIG. 14, the i7-th stage circuit STi7 may include an input part 1410, a first signal processing part 1420, a second signal processing part 1430, and an output part 1440. The input part 1410 and the output part 1440 of FIG. 14 may be described similarly to the input part 410 and the output part 440 of FIG. 4, respectively. Further, a first inverter 1421 and a second inverter 1431 of FIG. 14 may be described similarly to the first inverter 421 and the second inverter 431 of FIG. 4. Hereinafter, redundant descriptions are omitted.

According to an embodiment, the first signal processing part 1420 may include a second transistor T2, a third transistor T3, a first capacitor C1, a fourth transistor T4, and a tenth transistor T10. The second transistor T2, the third transistor T3, the first capacitor C1, and the fourth transistor T4 of FIG. 14 may be described similarly to the second transistor T2, the third transistor T3, the first capacitor C1, and the fourth transistor T4 of FIG. 4. Further, the tenth transistor T10 of FIG. 14 may be described similarly to the tenth transistor T10 of FIG. 6. Hereinafter, redundant descriptions are omitted.

According to an embodiment, the second signal processing part 1430 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 14 may be described similarly to the fifth transistor T5, the sixth transistor T6, the second capacitor C2, and the seventh transistor T7 of FIG. 4. Further, the eleventh transistor T11 of FIG. 14 may be described similarly to the eleventh transistor T11 of FIG. 10. Hereinafter, redundant descriptions are omitted.

Figure 15:
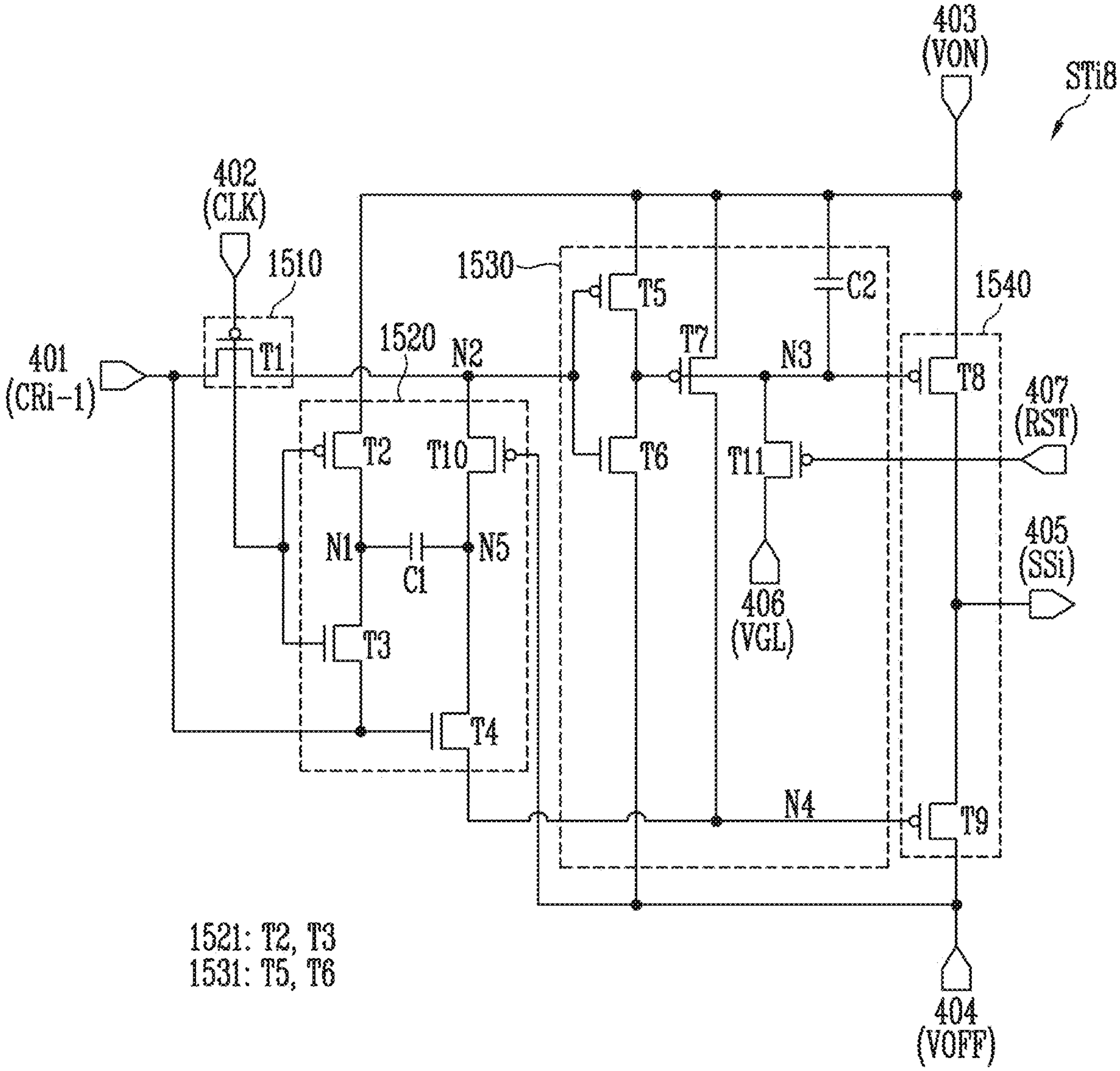

Referring to FIG. 15, the i8-th stage circuit STi8 may include an input part 1510, a first signal processing part 1520, a second signal processing part 1530, and an output part 1540. Each of the input part 1510 and the output part 1540 of FIG. 13 may be described similarly to the input part 410 and the output part 440 of FIG. 4. Further, a first inverter 1521 and a second inverter 1531 of FIG. 15 may be described similarly to the first inverter 421 and the second inverter 431 of FIG. 4. Hereinafter, redundant descriptions are omitted.

According to an embodiment, the first signal processing part 1520 may include a second transistor T2, a third transistor T3, a first capacitor C1, a fourth transistor T4, and a tenth transistor T10. The second transistor T2, the third transistor T3, the first capacitor C1, and the fourth transistor T4 of FIG. 15 may be described similarly to the second transistor T2, the third transistor T3, the first capacitor C1, and the fourth transistor T4 of FIG. 4. Further, the tenth transistor T10 of FIG. 15 may be described similarly to the tenth transistor T10 of FIG. 6. Hereinafter, redundant descriptions are omitted.

According to an embodiment, the second signal processing part 1530 may include a fifth transistor T5, a sixth transistor T6, a second capacitor C2, a seventh transistor T7, and an eleventh transistor T11. The fifth transistor T5, the sixth transistor T6, the second capacitor C2, and the seventh transistor T7 of FIG. 15 may be described similarly to the fifth transistor T5, the sixth transistor T6, the second capacitor C2, and the seventh transistor T7 of FIG. 4. Further, the eleventh transistor T11 of FIG. 15 may be described similarly to the eleventh transistor T11 of FIG. 11. Hereinafter, redundant descriptions are omitted.

According to embodiments of the disclosure, a stage circuit ST for a display scan driver 120 is disclosed that includes inverters, capacitors and transistors, where a boosting capacitor C1 is included between two nodes N1 and N2 to decrease a voltage at a second node N2 according to a voltage across the capacitor. The decreased voltage is transferred to a fourth node N4 to reliably turn on an output transistor T9 so that a low voltage VOFF can be reliably output to the scan line SSi. Also, a first signal processing part that includes the first node N1 and the boosting capacitor C1 may also include another transistor T10 to prevent the voltage at the second node N2 from becoming excessively too high or too low to prevent thermal damage to the transistors, thereby further enhancing reliability of the scan driver 120.

Figure 16:
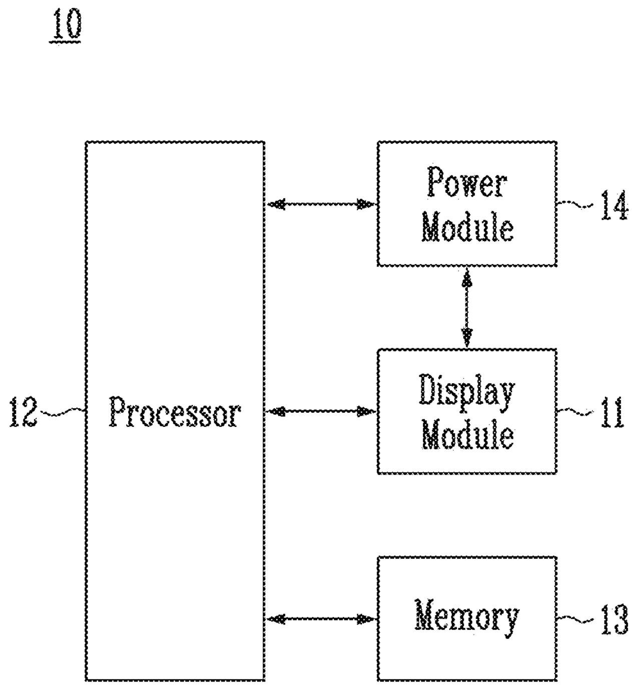
FIG. 16 is a block diagram of an electronic device according to an embodiment.

FIG. 16 is a block diagram of an electronic device according to an embodiment. Referring to FIG. 16, the electronic device 10 according to an embodiment may include a display module 11, a processor 12, a memory 13, and a power module 14. The display module 11 of FIG. 16 may be described similarly to the display device DD of FIG. 1.

The processor 12 may include at least one of a central processing unit (CPU), an application processor (AP), a graphics processing unit (GPU), a communication processor (CP), an image signal processor (ISP), and a controller.

The memory 13 may store data information desirable for operation of the processor 12 or the display module 11. When the processor 12 executes an application stored in the memory 13, image data signals and/or input control signals may be transmitted to the display module 11, and the display module 11 may process the received signals to output image information via the display screen.

The power module 14 may include a power supply module, such as a power adapter or battery part, and a power conversion module that converts power supplied by the power supply module to generate power required for operation of the electronic device 10.

According to an embodiment, the power module 14 may supply an on-voltage VON (see FIG. 3) and an off-voltage VOFF (see FIG. 3) to the display module 11. For example, the power module 14 may supply the on-voltage VON (see FIG. 3) and the off-voltage VOFF (see FIG. 3) to the third terminal 403 (see FIG. 4) and the fourth terminal 404 (see FIG. 4) of each of stages ST (see FIG. 3) of the gate driver 120 (see FIG. 1).

At least one of each of the above-described configurations of the electronic device 10 may be included in the display device according to the above-described embodiments. Furthermore, some of the individual modules that are functionally contained in a module may be included in the display device and others may be provided separately from the display device. For example, the display device may include a display module 11, while the processor 12, the memory 13, and the power module 14 may be provided in the form of other devices in the electronic device 10 other than the display device.

Figure 17:
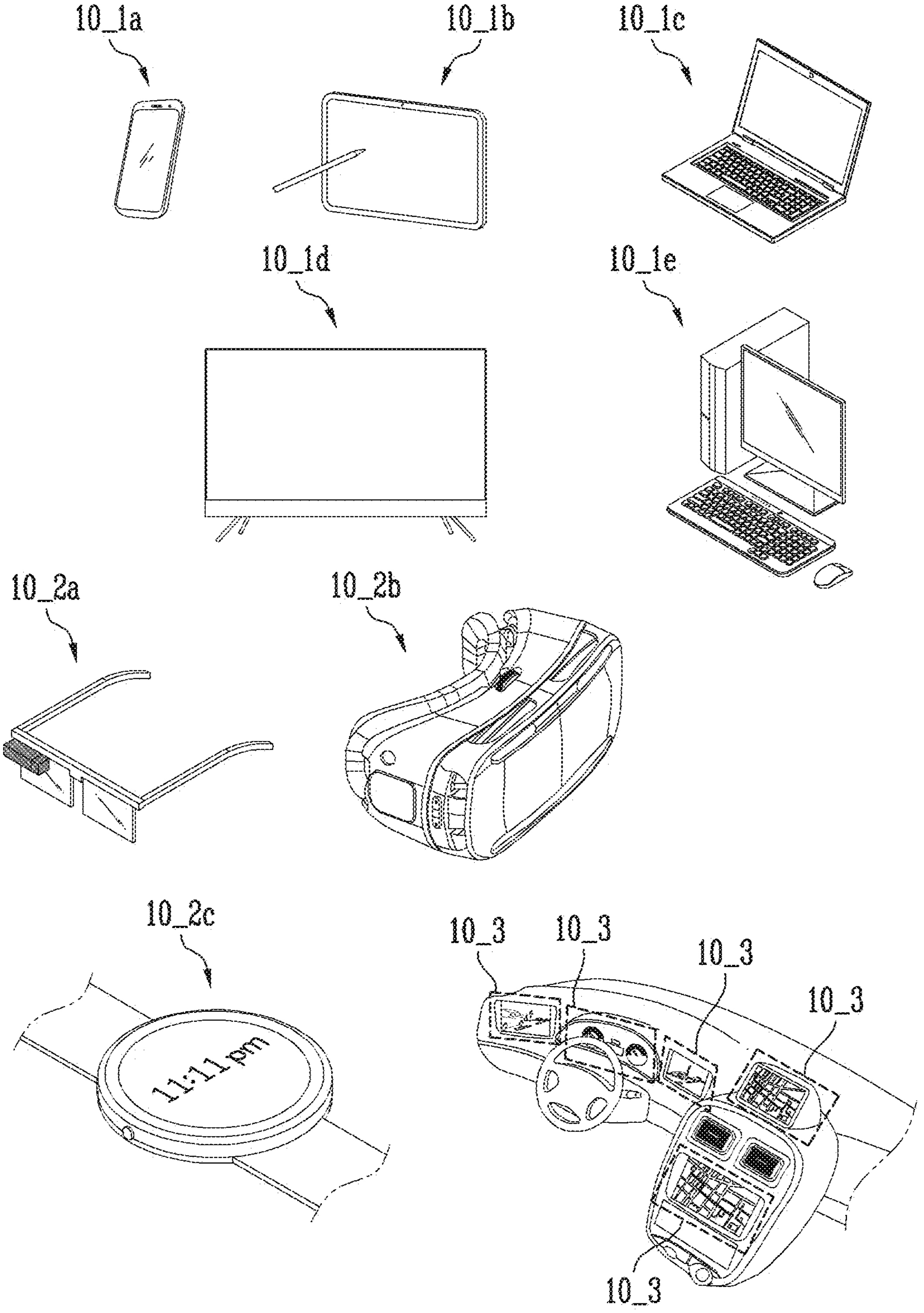
FIG. 17 illustrates diagrams of electronic devices according to various embodiments.

FIG. 17 is a diagram of an electronic device according to various embodiments.

Referring now to FIG. 17, various electronic devices with display devices according to embodiments include electronic devices for displaying images, such as a smartphone 10_1*a*, a tablet 10_1*b*, a laptops 10_1*c*, a television 10_1*d*, a computer monitor 10_1*e*, as well as a wearable electronic device including a display module such as a smart glass 10_2*a*, a head-mounted display 10_2*b*, a smart watch 10_2*c*, and the like, and an automotive electronic device 10_3 including a display module such as a center information displays (CID), a room mirror display, and the like placed on the instrument panel, center fascia, or dashboard of an automobile.

Although certain embodiments and applications have been described herein, other embodiments and variations may be derived from the above description. Accordingly, the ideas of the disclosure are not necessarily limited to these embodiments, but extend to the claims set forth below, various obvious variations, and equivalents.

What is claimed is:

1. A stage circuit comprising:
a first terminal which to a carry signal is input;
a second terminal which to a clock signal is input;
a third terminal which to an on-voltage is input;
a fourth terminal which to an off-voltage is input;
an input part configured to transmit the carry signal to a second node in response to the clock signal;
a first signal processing part configured to selectively transmit the on-voltage and the carry signal to a first node in response to the clock signal, the first signal processing part including:
a capacitor connected between the first node and the second node; and
a switching element electrically connecting the second node to a fourth node;
a second signal processing part configured to control a voltage of a third node in response to a voltage of the second node; and
an output part configured to selectively output the on-voltage and the off-voltage as a scan signal depending on the voltage of the third node and a voltage of the fourth node.

2. The stage circuit of claim 1, wherein
the first signal processing part further includes a first inverter connected between the first terminal and the third terminal, and
the first signal processing part configured to selectively transmit the carry signal of the first terminal and an on-voltage of the third terminal to the first node in response to the clock signal.

3. The stage circuit of claim 2, wherein
the switching element further includes a transistor connected between the second node and the fourth node, and
the switching element configured to turn on in response to the carry signal.

4. The stage circuit of claim 1, wherein
the second signal processing part includes a second inverter connected between the third terminal and the fourth terminal, and
the second signal processing part configured to selectively transmit the on-voltage of the third terminal and the off-voltage of the fourth terminal to the third node in response to a voltage of the second node.

5. The stage circuit of claim 4, wherein the second signal processing part further includes a transistor configured to electrically connect the third terminal and the fourth node in response to the voltage of the third node.

6. The stage circuit of claim 1, wherein:
after the carry signal is enabled to a high level, the voltage of the second node has a first voltage level,
after the carry signal is disabled to a low level and as the carry signal is transmitted to the second node in response to the clock signal, the voltage of the second node transitions from the first voltage level to a second voltage level, and
the second voltage level is lower than the first voltage level.

7. The stage circuit of claim 6, wherein after the voltage of the second node transitions to the second voltage level, the low level of the carry signal is transmitted to the first node in response to the clock signal causing the voltage of the first node to decrease.

8. The stage circuit of claim 7, wherein:
as a decrease in the voltage of the first node is transmitted to the second node via the capacitor, the voltage of the second node transitions from the second voltage level to a third voltage level, and
the third voltage level is lower than the second voltage level.

9. The stage circuit of claim 8, wherein the switching element is configured to transmit the third voltage level of the second node to the fourth node.

10. The stage circuit of claim 1, further comprising:
a reset terminal that receives a reset signal,
wherein the second signal processing part is configured to initialize the voltage of the third node in response to the reset signal.

11. The stage circuit of claim 1, further comprising:
a reset terminal receiving a reset signal,
wherein the second signal processing part is configured to initialize the voltage of the fourth node in response to the reset signal.

12. A display device comprising:
pixels; and
a plurality of stage circuits providing scan signals to the pixels via scan lines,
wherein one of the plurality of stage circuits includes:
a first transistor including a first electrode connected to a first terminal to which a carry signal is input, a second electrode connected to a second node, and a gate electrode connected to a second terminal to receive a clock signal;

a second transistor including a first electrode connected to a third terminal to receive an on-voltage, a second electrode connected to a first node, and a gate electrode connected to the second terminal;

a third transistor including a first electrode connected to the first node, a second electrode connected to the first terminal, and a gate electrode connected to the second terminal;

a first capacitor connected between the first node and the second node;

a fourth transistor including a first electrode connected to the second node, a second electrode connected to a fourth node, and a gate electrode connected to the first terminal;

a fifth transistor including a first electrode connected to the third terminal, a second electrode connected to a third node, and a gate electrode connected to the second node; and a sixth transistor including a first electrode connected to the third node, a second electrode connected to a fourth terminal to which an off-voltage is input, and a gate electrode connected to the second node.

13. The display device of claim 12, wherein the one of the plurality of stage circuits further includes:

a seventh transistor including a first electrode connected to the third terminal, a second electrode connected to the fourth node, and a gate electrode connected to the third node;

an eighth transistor including a first electrode connected to the third terminal, a second electrode connected to an output terminal, and a gate electrode connected to the third node;

a ninth transistor including a first electrode connected to the output terminal, a second electrode connected to the fourth terminal, and a gate electrode connected to the fourth node; and a second capacitor connected between the third terminal and the third node.

14. The display device of claim 12, wherein the one of the plurality of stage circuits further includes a tenth transistor including:

a first electrode connected to the second node;

a second electrode connected to a fifth node that is connected to the fourth transistor and the first capacitor; and a gate electrode connected to the fourth terminal.

15. The display device of claim 12, wherein the one of the plurality of stage circuits further includes an eleventh transistor including:

a first electrode receiving either the on-voltage or the off-voltage;

a second electrode connected to the fourth node; and a gate electrode connected to a reset terminal receiving a reset signal.

16. The display device of claim 12, wherein the one of the plurality of stage circuits further includes an eleventh transistor including:

a first electrode connected to the third node;

a second electrode receiving either the on-voltage or the off-voltage; and a gate electrode connected to a reset terminal receiving a reset signal.

17. The display device of claim 14, wherein the one of the plurality of stage circuits further includes an eleventh transistor including:

a first electrode receiving either the on-voltage or the off-voltage;

a second electrode connected to the fourth node; and a gate electrode connected to a reset terminal receiving a reset signal.

18. The display device of claim 14, wherein the one of the plurality of stage circuits further includes: an eleventh transistor including:

a first electrode connected to the third node;

a second electrode receiving either the on-voltage or the off-voltage; and a gate electrode connected to a reset terminal receiving a reset signal.

19. The display device of claim 12, wherein the second transistor and the fifth transistor include a P-type semiconductor, and the third transistor and the sixth transistor include an N-type semiconductor.

20. An electronic device comprising:

a processor configured to provide input image data; and a display device configured to display an image based on the input image data, wherein the display device includes:

pixels; and a plurality of stage circuits providing scan signals to the pixels via scan lines, each of the plurality of stage circuits includes:

a first terminal which to a carry signal is input;

a second terminal which to a clock signal is input;

a third terminal which to an on-voltage is input;

a fourth terminal which to an off-voltage is input;

an input part configured to transmit the carry signal to a second node in response to the clock signal;

a signal processing part including:

a first control part configured to control a voltage of a first node in response to the clock signal; and a second control part configured to control a voltage of a third node in response to the carry signal, wherein the signal processing part is configured to change a voltage of the second node in response to a change in the voltage of the first node; and an output part configured to selectively output the on-voltage and the off-voltage as a scan signal depending on the voltage of the third node and a voltage of a fourth node, wherein each of the first control part and the second control part includes different types of transistors.

* * * * *